United States Patent
Ueki et al.

(10) Patent No.: US 8,554,070 B2
(45) Date of Patent: Oct. 8, 2013

(54) OPTICAL TRANSMISSION APPARATUS AND OPTICAL ATTENUATION AMOUNT CONTROL METHOD

(75) Inventors: Taichi Ueki, Kawasaki (JP); Shigeru Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 13/229,443

(22) Filed: Sep. 9, 2011

(65) Prior Publication Data

US 2012/0230681 A1 Sep. 13, 2012

(30) Foreign Application Priority Data

Sep. 14, 2010 (JP) .................................. 2010-205711

(51) Int. Cl.
*G02F 1/00* (2006.01)
*H04B 10/08* (2011.01)
*H04B 10/04* (2011.01)

(52) U.S. Cl.
USPC .................................. 398/7; 398/34; 398/182

(58) Field of Classification Search
USPC ............................. 398/9–38, 135–139, 7, 182
See application file for complete search history.

(56) References Cited

U.S. PATENT DOCUMENTS

| | | | | |
|---|---|---|---|---|
| 7,209,661 B2 * | 4/2007 | Mori et al. | ....................... | 398/79 |
| 7,813,642 B2 * | 10/2010 | Muro et al. | ....................... | 398/95 |
| 2002/0021463 A1 * | 2/2002 | Turner et al. | ................... | 359/124 |
| 2003/0099475 A1 * | 5/2003 | Nemoto et al. | ................... | 398/83 |
| 2004/0131353 A1 * | 7/2004 | Cannon et al. | ..................... | 398/1 |
| 2008/0095537 A1 * | 4/2008 | Sakamoto | ......................... | 398/83 |
| 2009/0297143 A1 * | 12/2009 | Takeyama et al. | ............... | 398/34 |
| 2010/0028008 A1 * | 2/2010 | Nakajima | ........................ | 398/83 |

FOREIGN PATENT DOCUMENTS

| | | |
|---|---|---|
| JP | 2003-46448 A | 2/2003 |
| JP | 2009-290593 A | 12/2009 |

* cited by examiner

*Primary Examiner* — Ken Vanderpuye
*Assistant Examiner* — Dibson Sanchez
(74) *Attorney, Agent, or Firm* — Fujitsu Patent Center

(57) ABSTRACT

A storage device stores information regarding a channel from which an optical transmission apparatus at a subsequent stage drops a signal light. A processor determines that switching from second channel transmission using a larger number of channels than a first number of channels to first channel transmission is performed, and controls an attenuation amount, when performing the first channel transmission using the first number of channels, by referring to the storage device according to the determination and making the attenuation amount in a no-signal channel larger than a determine value if the no-signal channel whose wavelength is within a determined range from the wavelength of the signal light channel for the first channel transmission is a channel from which the optical transmission apparatus at the subsequent stage drops a signal light, so as to transmit an amplified spontaneous emission light along the no-signal channel.

9 Claims, 31 Drawing Sheets

| DOWNSTREAM NODE NAME | CHANNEL | TRANSMISSION CHANNEL INFORMATION | PATH INFORMATION |
|---|---|---|---|
| NODE B | 1 | 0 | 0 |
| NODE B | 2 | 0 | 0 |
| ⋮ | ⋮ | ⋮ | ⋮ |
| NODE B | a | 1 | 0 |
| NODE B | b | 1 | 0 |
| NODE B | c | 1 | 0 |
| ⋮ | ⋮ | ⋮ | ⋮ |

FIG. 10

| DOWNSTREAM NODE NAME | CHANNEL | TRANSMISSION CHANNEL INFORMATION | PATH INFORMATION |
|---|---|---|---|
| NODE C | 1 | 0 | 0 |
| NODE C | 2 | 0 | 0 |
| ⋮ | ⋮ | ⋮ | ⋮ |
| NODE C | a | 1 | 0 |
| NODE C | b | 1 | 0 |
| NODE C | c | 1 | 0 |
| ⋮ | ⋮ | ⋮ | ⋮ |

FIG. 11

| DOWNSTREAM NODE NAME | CHANNEL | TRANSMISSION CHANNEL INFORMATION | PATH INFORMATION |
|---|---|---|---|
| NODE D | 1 | 0 | 0 |
| NODE D | 2 | 0 | 0 |
| ⋮ | ⋮ | ⋮ | ⋮ |
| NODE D | a | 1 | 0 |
| NODE D | b | 1 | 0 |
| NODE D | c | 1 | 0 |
| ⋮ | ⋮ | ⋮ | ⋮ |

FIG. 12

| DOWNSTREAM NODE NAME | CHANNEL | TRANSMISSION CHANNEL INFORMATION | PATH INFORMATION |
|---|---|---|---|
| NODO E | 1 | 0 | 0 |
| NODO E | 2 | 0 | 0 |
| ⋮ | ⋮ | ⋮ | ⋮ |
| NODO E | a | 1 | 1 |
| NODO E | b | 1 | 1 |
| NODO E | c | 1 | 0 |
| ⋮ | ⋮ | ⋮ | ⋮ |

FIG. 13

| DOWNSTREAM NODE NAME | CHANNEL | TRANSMISSION CHANNEL INFORMATION | PATH INFORMATION |
|---|---|---|---|
| NODE B | 1 | 0 | 0 |
| NODE B | 2 | 0 | 0 |
| ⋮ | ⋮ | ⋮ | ⋮ |
| NODE B | a | 1 | 0 |
| NODE B | b | 1 | 0 |
| NODE B | c | 1 | 0 |
| ⋮ | ⋮ | ⋮ | ⋮ |

FIG. 19

| DOWNSTREAM NODE NAME | CHANNEL | TRANSMISSION CHANNEL INFORMATION | PATH INFORMATION |
|---|---|---|---|
| NODE C | 1 | 0 | 0 |
| NODE C | 2 | 0 | 0 |
| ⋮ | ⋮ | ⋮ | ⋮ |
| NODE C | a | 1 | 0 |
| NODE C | b | 1 | 0 |
| NODE C | c | 1 | 0 |
| ⋮ | ⋮ | ⋮ | ⋮ |

FIG. 20

| DOWNSTREAM NODE NAME | CHANNEL | TRANSMISSION CHANNEL INFORMATION | PATH INFORMATION |
|---|---|---|---|
| NODE D | 1 | 0 | 0 |
| NODE D | 2 | 0 | 0 |
| ⋮ | ⋮ | ⋮ | ⋮ |
| NODE D | a | 1 | 0 |
| NODE D | b | 1 | 0 |
| NODE D | c | 1 | 0 |
| ⋮ | ⋮ | ⋮ | ⋮ |
| NODE Z | 1 | 0 | 0 |
| ⋮ | ⋮ | ⋮ | ⋮ |

FIG. 21

| DOWNSTREAM NODE NAME | CHANNEL | TRANSMISSION CHANNEL INFORMATION | PATH INFORMATION |
|---|---|---|---|
| NODE E | 1 | 0 | 0 |
| NODE E | 2 | 0 | 0 |
| ⋮ | ⋮ | ⋮ | ⋮ |
| NODE E | a | 1 | 1 |
| NODE E | b | 1 | 1 |
| NODE E | c | 1 | 0 |
| ⋮ | ⋮ | ⋮ | ⋮ |

FIG. 22

| DOWNSTREAM NODE NAME | CHANNEL | TRANSMISSION CHANNEL INFORMATION | PATH INFORMATION |
|---|---|---|---|
| NODE B | 1 | 0 | 0 |
| NODE B | 2 | 0 | 0 |
| ⋮ | ⋮ | ⋮ | ⋮ |
| NODE B | a | 1 | 1 |
| NODE B | b | 1 | 1 |
| NODE B | c | 1 | 0 |
| ⋮ | ⋮ | ⋮ | ⋮ |

FIG. 25

| DOWNSTREAM NODE NAME | CHANNEL | TRANSMISSION CHANNEL INFORMATION | PATH INFORMATION |
|---|---|---|---|
| NODE D | 1 | 0 | 0 |
| NODE D | 2 | 0 | 0 |
| ⋮ | ⋮ | ⋮ | ⋮ |
| NODE D | a | 1 | 0 |
| NODE D | b | 1 | 0 |
| NODE D | c | 1 | 0 |
| ⋮ | ⋮ | ⋮ | ⋮ |

FIG. 26

| DOWNSTREAM NODE NAME | CHANNEL | TRANSMISSION CHANNEL INFORMATION | PATH INFORMATION |
|---|---|---|---|
| NODE E | 1 | 0 | 0 |
| NODE E | 2 | 0 | 0 |
| ⋮ | ⋮ | ⋮ | ⋮ |
| NODE E | a | 1 | 1 |
| NODE E | b | 1 | 1 |
| NODE E | c | 1 | 0 |
| ⋮ | ⋮ | ⋮ | ⋮ |

FIG. 27

OPTICAL TRANSMISSION APPARATUS AND OPTICAL ATTENUATION AMOUNT CONTROL METHOD

CROSS-REFERENCE TO RELATED APPLICATION

This application is based upon and claims the benefit of priority of the prior Japanese Patent Application No. 2010-205711, filed on Sep. 14, 2010, the entire contents of which are incorporated herein by reference.

FIELD

The embodiments discussed herein are related to an optical transmission apparatus for transmitting a signal light and an optical attenuation amount control method by such an optical transmission apparatus.

BACKGROUND

In recent years an increase in communication traffic has promoted introduction of WDM (Wavelength Division Multiplex) optical transmission apparatus. The number of ring networks or mesh networks using such optical transmission apparatus has increased.

If small-number channel transmission using a small number of channels is performed in such an optical network, the fact that OSNR (Optical Signal-to-Noise Ratio) in the small number of channels falls by the influence of PHB (Polarization Hole-Burning) and that the transmission characteristics deteriorate is known.

Accordingly, an optical transmission apparatus which reduces the influence of PHB and which controls an OSNR degradation is proposed (see, for example, Japanese Laid-open Patent Publication No. 2009-290593). This optical transmission apparatus reduces the influence of PHB in the following way. Of channels (no-signal channels) via which a signal is not transmitted, an attenuation amount in a VOA (Variable Optical Attenuator) in a channel adjacent to a channel (signal light channel) via which a signal is transmitted is made small and an ASE (Amplified Spontaneous Emission) light generated by amplification on the upstream side is transmitted along the channel.

In addition to a currently used system, an optical network includes a spare system as a redundant line in order to avoid a communication failure such as the slipping off of a fiber cable or the breaking of a line. A redundant line is, for example, an OUPSR (Optical Unidirectional Path Switched Ring). An optical transmission apparatus monitors the power of a signal light. When the power of a signal light becomes equal to or lower than a determined threshold, the optical transmission apparatus determines that a communication failure, such as the breaking of a line, has occurred, and switches a line from a currently used system to a spare system.

With conventional optical transmission apparatus, however, the following problem arises. For example, if switching from multichannel transmission to small-number channel transmission is performed due to a communication failure such as the breaking of a line, an ASE light may be transmitted along a channel which changes from a signal light channel to a no-signal channel. In this case, a downstream optical transmission apparatus recognizes an ASE light transmitted along the channel as a signal light. As a result, the downstream optical transmission apparatus cannot detect the communication failure, such as the breaking of a line, and perform switching to a redundant line.

SUMMARY

According to an aspect of the invention, An optical transmission apparatus includes: a storage device which stores information regarding a channel from which an optical transmission apparatus at a subsequent stage drops a signal light; and a processor that is operative to determine that switching from second channel transmission using a larger number of channels than a first number of channels to a first channel transmission is performed, and to control an attenuation amount, at the time of performing the first channel transmission using the first number of channels, so as to transmit an amplified spontaneous emission light along a no-signal channel a wavelength for which is within a determined range from a wavelength for a signal light channel, and to refer to the storage device according to the determination and make, in the case of the no-signal channel the wavelength for which is within the determined range from the wavelength for the signal light channel used in the first channel transmission being the channel from which the optical transmission apparatus at the subsequent stage drops a signal light, an attenuation amount in the no-signal channel larger than a determined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of the structure of channel setting information stored in a downstream node information storage section (part 1);

FIG. 11 illustrates an example of the structure of channel setting information stored in a downstream node information storage section (part 2);

FIG. 12 illustrates an example of the structure of channel setting information stored in a downstream node information storage section (part 3);

FIG. 13 illustrates an example of the structure of channel setting information stored in a downstream node information storage section (part 4);

FIG. 19 illustrates an example of the structure of channel setting information stored in a downstream node information storage section (part 1);

FIG. 20 illustrates an example of the structure of channel setting information stored in a downstream node information storage section (part 2);

FIG. 21 illustrates an example of the structure of channel setting information stored in a downstream node information storage section (part 3);

FIG. 22 illustrates an example of the structure of channel setting information stored in a downstream node information storage section (part 4);

FIG. 25 illustrates an example of the structure of channel setting information stored in a downstream node information storage section (part 1);

FIG. 26 illustrates an example of the structure of channel setting information stored in a downstream node information storage section (part 2);

FIG. 27 illustrates an example of the structure of channel setting information stored in a downstream node information storage section (part 3);

DESCRIPTION OF EMBODIMENTS

A first embodiment will now be described in detail with reference to the accompanying drawing.

Figure 1:
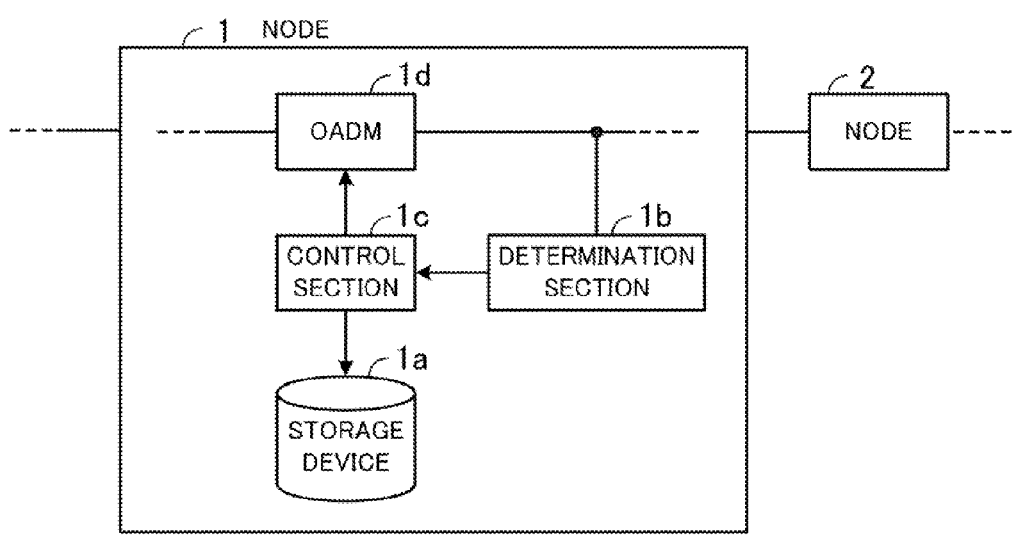
FIG. 1 illustrates an optical transmission apparatus according to a first embodiment.

FIG. 1 illustrates an optical transmission apparatus according to a first embodiment. FIG. 1 illustrates a node 1 which is an optical transmission apparatus and a node 2 which receives a signal light from the node 1 and which is connected at the subsequent stage of the node 1. The nodes 1 and 2 and nodes (not illustrated) form, for example, an OUPSR network or a mesh network.

The node 1 includes a storage device 1a, a determination section 1b, a control section 1c, and an OADM (Optical Add Drop Multiplexer) 1d. The functions of the node 2 and the nodes (not illustrated) are the same as that of the node 1. If small-number channel transmission using a first number of channels (one-channel optical transmission or several-channel optical transmission using adjacent channels in which OSNR falls by the influence of PHB) is performed, each of the nodes 1 and 2 controls an attenuation amount so as to transmit an amplified spontaneous emission light along a no-signal channel a wavelength for which is within a determined range from a wavelength for a signal light channel used in the small-number channel transmission.

The OADM 1d adds or drops a signal light. The OADM 1d includes a variable optical attenuator and can control attenuation amount according to channel.

The storage device 1a stores information regarding a channel from which the node 2 at the subsequent stage drops a signal light. For example, if the node 2 at the subsequent stage drops signal lights from channels a and b, then the storage device 1a stores information which is indicative that the node 2 at the subsequent stage drops signal lights from the channels a and b.

The determination section 1b determines that switching from multichannel transmission using channels the number of which is larger than the first number to small-number channel transmission is performed. For example, the determination section 1b monitors the power of a signal light outputted from the OADM 1d according to channel, and determines that switching from multichannel transmission to small-number channel transmission is performed.

Switching from multichannel transmission to small-number channel transmission is performed, for example, because of a communication failure, such as the breaking of a line, which has occurred on the upstream side of the node 1. For example, it is assumed that the determination section 1b detects that signal lights are transmitted along the channels a, b and c (channels a, b, and c are adjacent to one another). Furthermore, it is assumed that transmission of signal lights along the channels a and c is stopped because of the breaking of a line on the upstream side of the node 1. In this case, switching from detection of a signal light in the channels a, b, and c to detection of a signal light in the channel b is performed. That is to say, the determination section 1b determines that switching from multichannel transmission to small-number channel transmission is performed. The determination processing is performed by the processor.

The control section 1c refers to the storage device 1a according to determination made by the determination section 1b. If the node 2 at the subsequent stage drops a signal light from a no-signal channel a wavelength for which is within a determined range from a wavelength for a signal light channel used in the small-number channel transmission, then the control section 1c makes an attenuation amount in the no-signal channel larger than a determined value. For example, the control section 1c controls the variable optical attenuator included in the OADM 1d to make an attenuation amount in the no-signal channel from which the node 2 drops a signal light larger than the determined value.

As with the above example, for example, it is assumed that switching from the multichannel transmission using the channels a, b, and c to the small-number channel transmission using the channel b is performed because of the breaking of a line on the upstream side. In addition, it is assumed that the node 2 at the subsequent stage drops signal lights from the channels a and b and that the storage device 1a stores information regarding the channels a and b. In this case, the control section 1c makes an attenuation amount in the no-signal channel "a" which is adjacent to the signal light channel "b" used in the small-number channel transmission (wavelength for which is within a determined range from a wavelength for the signal light channel "b" used in the small-number channel transmission) and from which the node 2 drops a signal light larger than the determined value. For example, a power value at which the node 2 at the subsequent stage determines that a signal light is not transmitted along the channel a is used as the determined value. The control processing is performed by the processor.

As a result, the power of a signal light which the node 2 drops from the channel a becomes low, so the node 2 can recognize that a signal light is not transmitted along the channel a because of a communication failure. Accordingly, the node 2 can switch a line from a currently used system to a spare system.

If the node 2 at the subsequent stage does not drop a signal light from the channel a, then the control section 1c makes an attenuation amount in the channel "a" small so as to transmit an ASE light along the channel "a".

As has been described, the node 1 determines that switching from multichannel transmission to small-number channel transmission is performed. If the node 2 at the subsequent stage drops a signal light from a no-signal channel a wavelength for which is within a determined range from a wavelength for a signal light channel used in the small-number channel transmission, the node 1 makes an attenuation amount in the no-signal channel larger than a determined value.

By doing so, the node 2 at the subsequent stage can detect a communication failure, such as the breaking of a line, which has occurred on the upstream side. In addition, by detecting a communication failure, the node 2 can switch a line from a currently used system to a spare system.

A second embodiment will now be described in detail with reference to the accompanying drawings. Before that, an example in which a downstream node recognizes an ASE light which is transmitted along a channel as a signal light and in which the downstream node cannot detect a communication failure, such as the breaking of a line, will be described.

Figure 2:
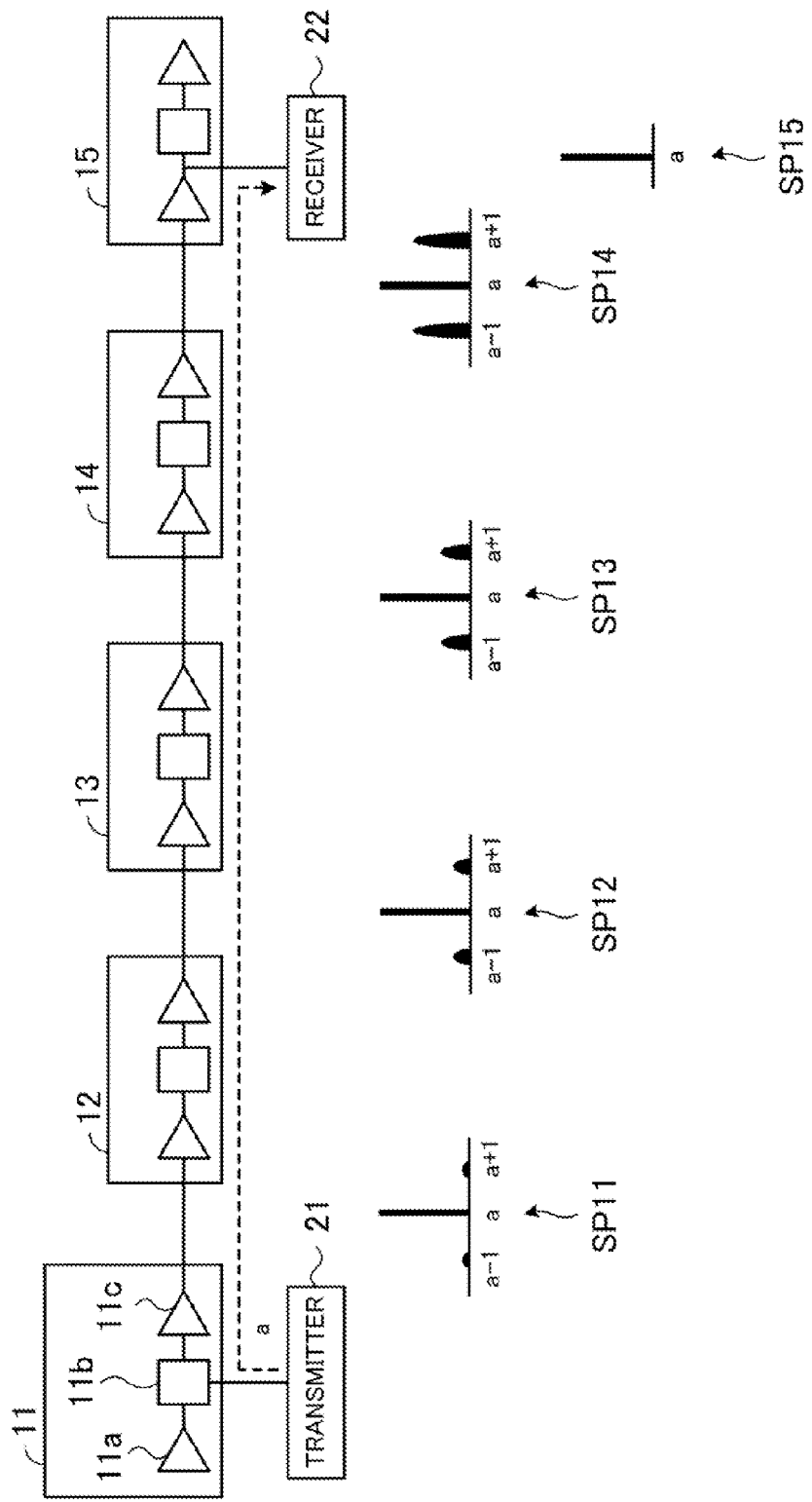
FIG. 2 illustrates an example of an optical network in which small-number channel transmission is performed.

FIG. 2 illustrates an example of an optical network in which small-number channel transmission is performed. As illustrated in FIG. 2, an optical network includes nodes 11 through 15 each of which is an optical transmission apparatus. The optical network of FIG. 2 is, for example, an OUPSR network or a mesh network (not illustrated).

The node 11 includes a preamplifier 11a which amplifies a signal light received from the upstream side, an OADM 11b which adds or drops a signal light, and a postamplifier 11c which amplifies a signal light added or dropped and outputs it to the downstream side. Each of the nodes 12 through 15 includes a preamplifier, an OADM, and a postamplifier. This is the same with the node 11.

A transmitter 21 is connected to the node 11 and a receiver 22 for receiving a signal from the transmitter 21 is connected to the node 15. The node 11 adds a signal light in a channel a to a signal light transmitted, and transmits a signal from the transmitter 21 by the signal light in the channel a. The signal light in the channel a is transmitted to the node 15 via the nodes 12 through 14. The node 15 drops the signal light in the channel a and outputs it to the receiver 22. Small-number channel transmission using the one channel a is performed in the optical network of FIG. 2.

FIG. 2 indicates spectra SP11 through SP14 of signal lights on transmission lines between the nodes 11 through 15. Furthermore, FIG. 2 indicates a spectrum SP15 of a signal light received by the receiver 22. Small-number channel transmission is performed in the optical network of FIG. 2, so each of the nodes 11 through 14 makes attenuation amounts in channels adjacent to the channel a smaller than, for example, an attenuation amount in the channel a, and transmits an ASE light generated by a preamplifier and a postamplifier along the channels.

As indicated by the spectra SP11 through SP14, for example, each of the nodes 11 through 14 makes attenuation amounts in channels (a−1) and (a+1) adjacent to the channel a small. By doing so, the influence of PHB on the signal light in the channel a is reduced and an OSNR degradation is controlled.

Figure 3:
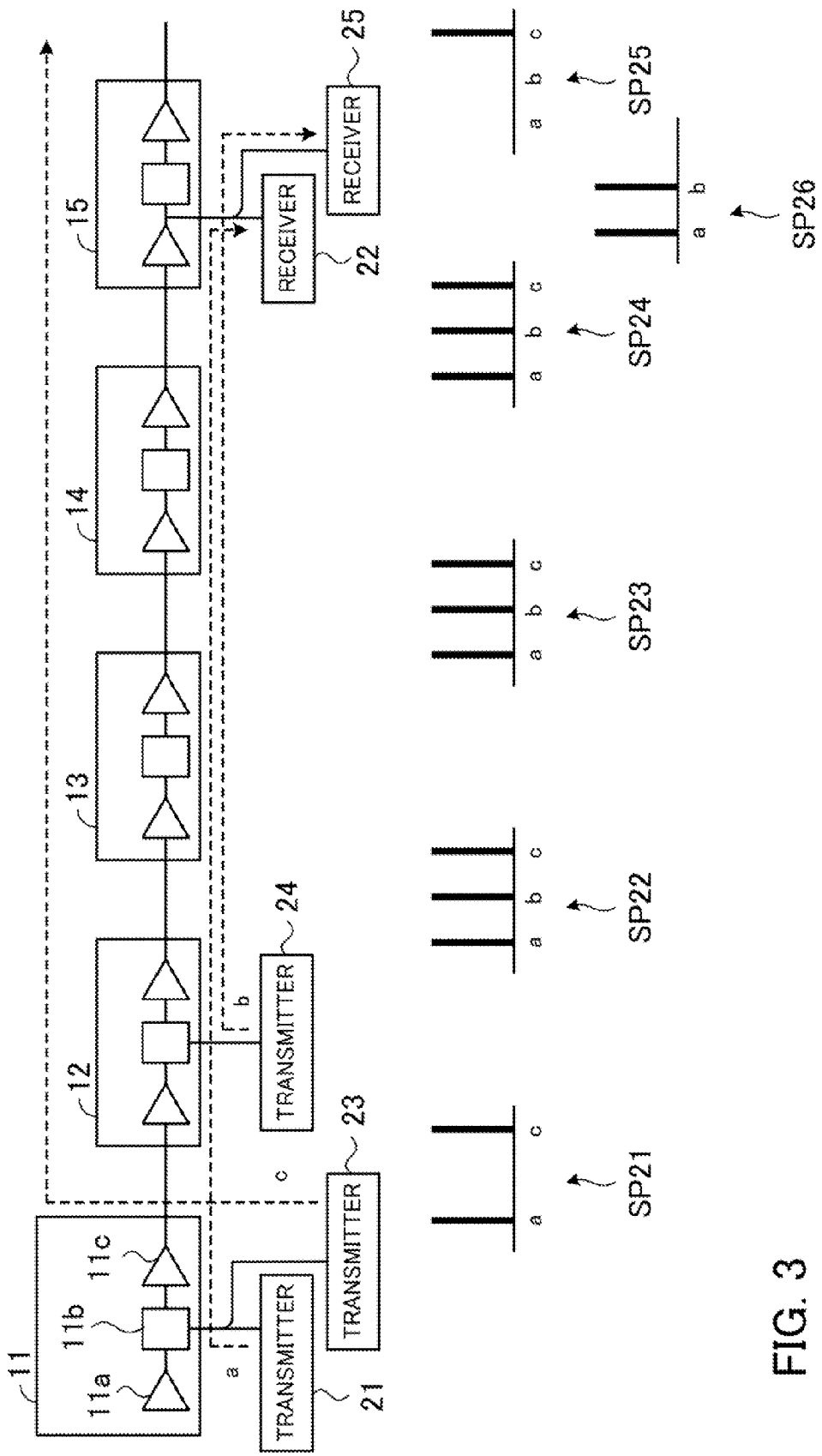
FIG. 3 illustrates an example of an optical network in which multichannel transmission is performed.

FIG. 3 illustrates an example of an optical network in which multichannel transmission is performed. Components in FIG. 3 which are the same as those in FIG. 2 are marked with the same symbols and descriptions of them will be omitted.

In FIG. 3, a transmitter 23 is connected to a node 11 and a transmitter 24 is connected to a node 12. Furthermore, a receiver 25 for receiving a signal from the transmitter 24 is connected to a node 15.

The node 11 adds a signal light in a channel c to a signal light transmitted, and transmits a signal from the transmitter 23 by the signal light in the channel c. The node 12 adds a signal light in a channel b to a signal light transmitted, and transmits a signal from the transmitter 24 by the signal light in the channel b. The node 15 drops a signal light in a channel a and outputs it to a receiver 22. In addition, the node 15 drops the signal light in the channel b and outputs it to the receiver 25. Multichannel transmission (in which the influence of PHB is small and an OSNR degradation is slight, that is to say, no influence is exercised on data transmission) using the three adjacent channels a, b, and c is performed in the optical network of FIG. 3.

FIG. 3 indicates spectra SP21 through SP25 of signal lights on transmission lines between the nodes 11 through 15. Furthermore, FIG. 3 indicates a spectrum SP26 of a signal light which the node 15 drops. Multichannel transmission is performed in the optical network of FIG. 3, so each of the nodes 11 through 14 exercises control so as to obtain desired power in the channels a, b, and c.

Figure 4:
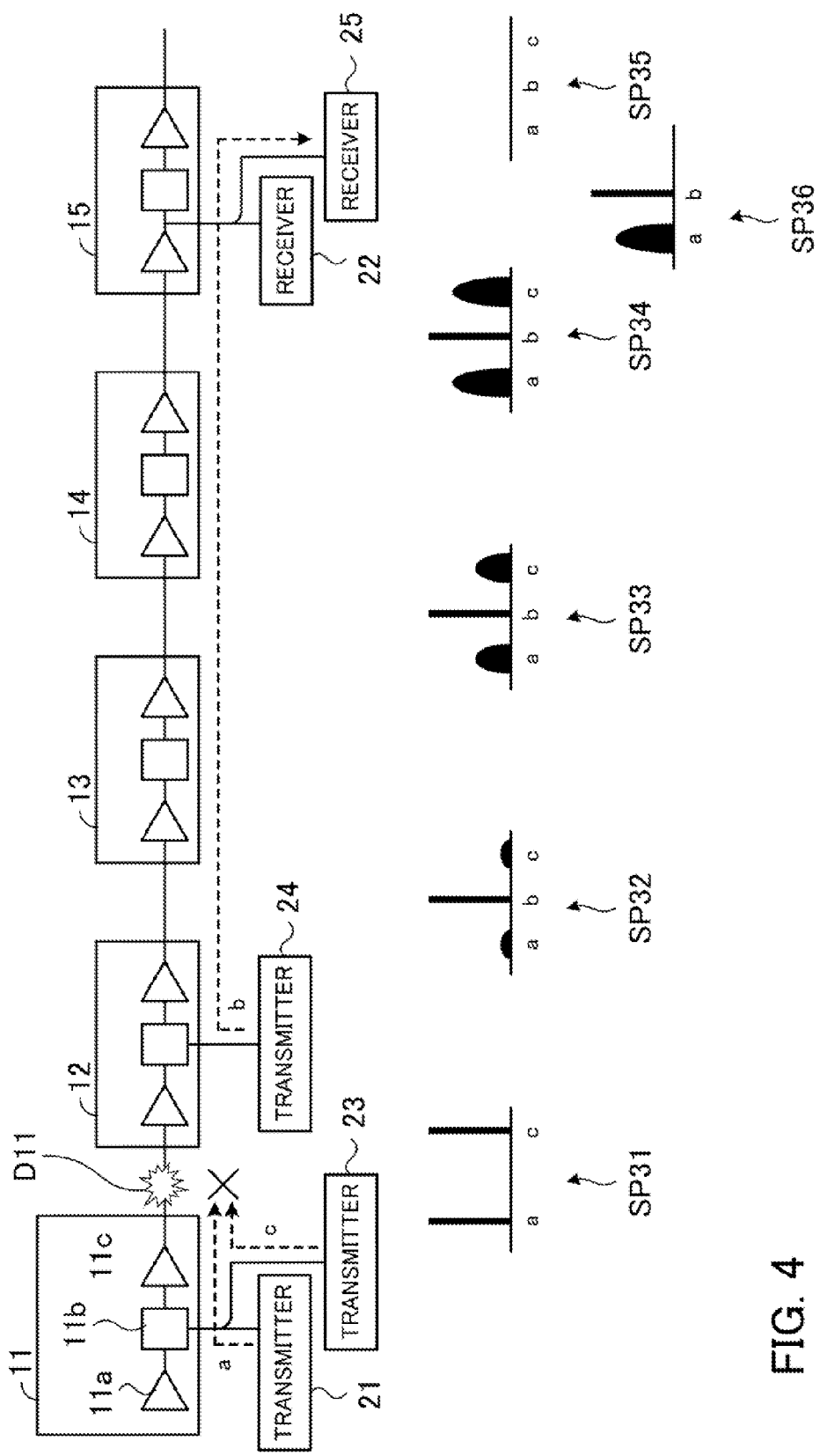
FIG. 4 illustrates an example of the occurrence of the breaking of a line in the optical network of FIG. 3.

FIG. 4 illustrates an example of the occurrence of the breaking of a line in the optical network of FIG. 3. Components in FIG. 4 which are the same as those in FIG. 3 are marked with the same symbols and descriptions of them will be omitted.

As illustrated in FIG. 4, it is assumed that breaking of a line D11 has occurred on a transmission line between the nodes 11 and 12. In this case, the signal light in the channel a or c is not transmitted to the nodes 12 through 15 on the downstream side of the node 11 and only the signal light in the channel b is transmitted to the node 15.

Small-number channel transmission is performed for the signal light in the channel b between the nodes 12 and 15. Accordingly, as indicated by spectra SP32 through SP34, the nodes 12 through 14 make attenuation amounts in the channels a and c adjacent to the channel b small in order to control an OSNR degradation in the channel b caused by PHB. That is to say, the nodes 12 through 14 make attenuation amounts in the channels a and c small so as to transmit an ASE light generated by the preamplifiers and the postamplifiers along the channels a and c. By doing so, the influence of PHB on the signal light in the channel b is reduced and an OSNR degradation is controlled.

However, the node 15 which drops the signal lights in the channels a and b receives the ASE light via the channel a. Accordingly, the node 15 cannot recognize that the breaking of the line D11 has occurred on the upstream side.

Figure 5:
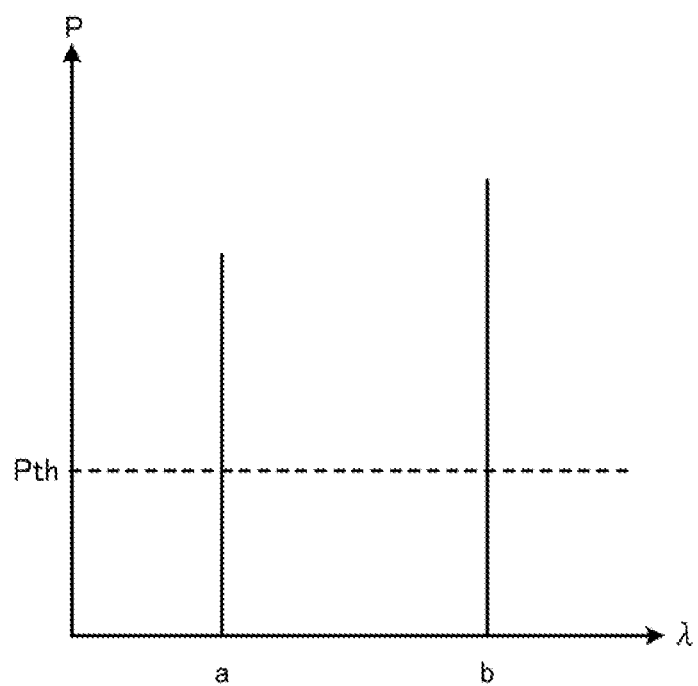
FIG. 5 is a view for describing an example of communication failure detection.

FIG. 5 is a view for describing an example of communication failure detection. The node 15 monitors the power of a signal light which the node 15 drops from a channel. When the power becomes lower than or equal to a determined threshold, the node 15 determines that a communication failure has occurred. The node 15 then switches a line from a currently used system to a spare system in order to avoid the communication failure.

As indicated in FIG. 5, for example, the node 15 monitors the power of a signal light which the node 15 drops from the channel a or b. When the power becomes lower than or equal to a threshold Pth, the node 15 determines that a communication failure has occurred. In the example of FIG. 4, however, the ASE light is transmitted along the channel a, so the node 15 cannot detect the breaking of the line D11.

As has been described, the nodes 12 through 14 transmit the ASE light along the channels a and c which become no-signal channels as a result of the breaking of the line D11. Accordingly, power in the channel a does not become lower than or equal to the threshold at the downstream node 15 which drops a signal light from the channel a or b because of the ASE light which is transmitted along the channel a. As a result, there may be cases where the node 15 cannot perform switching to a redundant line.

Figure 6:
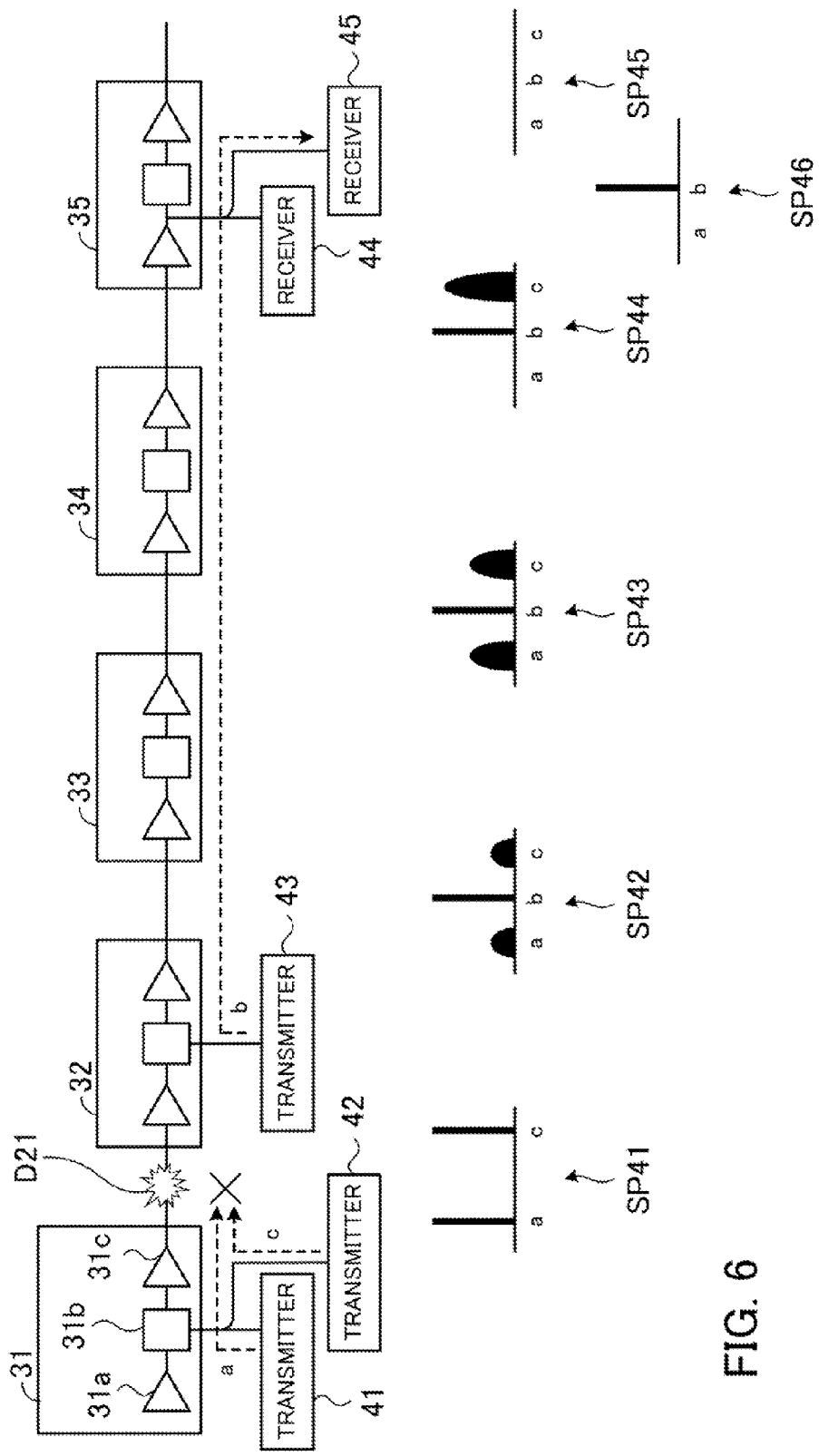
FIG. 6 illustrates an optical network to which an optical transmission apparatus according to a second embodiment is applied.

FIG. 6 illustrates an optical network to which an optical transmission apparatus according to a second embodiment is applied. As illustrated in FIG. 6, an optical network includes nodes 31 through 35 each of which is an optical transmission apparatus. The nodes 31 through 35 are connected to one another by, for example, optical fiber transmission lines. The optical network of FIG. 6 is, for example, an OUPSR network or a mesh network (not illustrated).

The node 31 includes a preamplifier 31a which amplifies a signal light received from the upstream side, an OADM 31b which adds or drops a signal light, and a postamplifier 31c which amplifies a signal light added or dropped and outputs it to the downstream side. Each of the nodes 32 through 35 includes a preamplifier, an OADM, and a postamplifier. This is the same with the node 31.

Transmitters 41 and 42 are connected to the node 31 and a transmitter 43 is connected to the node 32. A receiver 44 for receiving a signal from the transmitter 41 and a receiver 45 for receiving a signal from the transmitter 43 are connected to the node 35. A receiver for receiving a signal from the transmitter 42 is connected to, for example, a node (not illustrated) on the downstream side of the node 35.

The node 31 adds a signal light in a channel a to a signal light transmitted, and transmits a signal light from the transmitter 41 by the signal light in the channel a. In addition, the node 31 adds a signal light in a channel c to the signal light transmitted, and transmits a signal light from the transmitter 42 by the signal light in the channel c. The node 32 adds a signal light in a channel b to a signal light transmitted, and transmits a signal light from the transmitter 43 by the signal light in the channel b. It is assumed that the channels a, b, and c are adjacent to one another.

The node 35 drops the signal light in the channel a and outputs it to the receiver 44. In addition, the node 35 drops the signal light in the channel b and outputs it to the receiver 45.

When small-number channel transmission is performed, the nodes 31 through 35 transmit an ASE light along a no-signal channel a wavelength for which is within a determined range from wavelengths for the small number of channels in order to control an OSNR degradation of a signal light caused by PHB.

In addition, even when multichannel transmission is performed in the optical network, switching to small-number channel transmission may be performed as a result of the occurrence of a communication failure such as the breaking of a line. If a wavelength for a channel which becomes a no-signal channel as a result of the breaking of a line or the like is within a determined range from wavelengths for a small number of channels used for transmission without being influenced by the breaking of the line, then the nodes 31 through 35 transmit an ASE light along the no-signal channel. Hereinafter a channel which changes from a signal light channel to a no-signal channel as a result of a communication failure, such as the breaking of a line, is also referred to as a no-signal transition channel.

Furthermore, a node on the upstream side of and next to a node which drops a signal light from the no-signal transition channel attenuates the ASE light transmitted via the no-signal transition channel. As a result, at the node which drops a signal light from the no-signal transition channel, the power of a signal light in the no-signal transition channel becomes lower than a threshold (hereinafter also referred to simply as a threshold) for determining whether or not breaking of a line has occurred. Accordingly, the node which drops a signal light from the no-signal transition channel can detect a communication failure such as the breaking of a line.

For example, it is assumed that a communication failure, such as the breaking of a line, has not occurred in the optical network of FIG. 6. In this case, multichannel transmission using the channels a, b, and c is performed in the optical network of FIG. 6.

As illustrated in FIG. 6, it is assumed that breaking of a line D21 occurs between the nodes 31 and 32 and that the channels a and c become no-signal transition channels at the downstream nodes including the node 32. In this case, small-number channel transmission using the channel b is performed between the nodes 32 and 35. Spectra SP41 through 45 in FIG. 6 indicate the spectra of signal lights on a transmission line between the nodes 31 and 35 at the time of the occurrence of the breaking of the line D21. A spectrum SP46 is the spectrum of a signal light dropped by the node 35.

The no-signal transition channels a and c are adjacent to the channel b (wavelengths for the no-signal transition channels a and c are within a determined range from a wavelength for the channel b) used for transmission between the nodes 32 and 35. Accordingly, as indicated by the spectra SP42 and SP43, the nodes 32 and 33 make attenuation amounts in the no-signal transition channels a and c small so as to transmit an ASE light along the no-signal transition channels a and c. By doing so, an OSNR degradation of a signal light in the channel b caused by PHB is controlled.

As indicated by the spectrum SP44, the node 34 on the upstream side of and next to the node 35 which drops a signal light from the no-signal transition channel a attenuates the ASE light in the no-signal transition channel a. Accordingly, the spectrum of signal lights which the node 35 drops from the channels a and b is indicated by the spectrum SP46, so the node 35 can detect that there is no signal in the channel a which has become a no-signal channel as a result of the breaking of the line D21. As a result, the node 35 can switch a line from a currently used system to a spare system.

Figure 7:
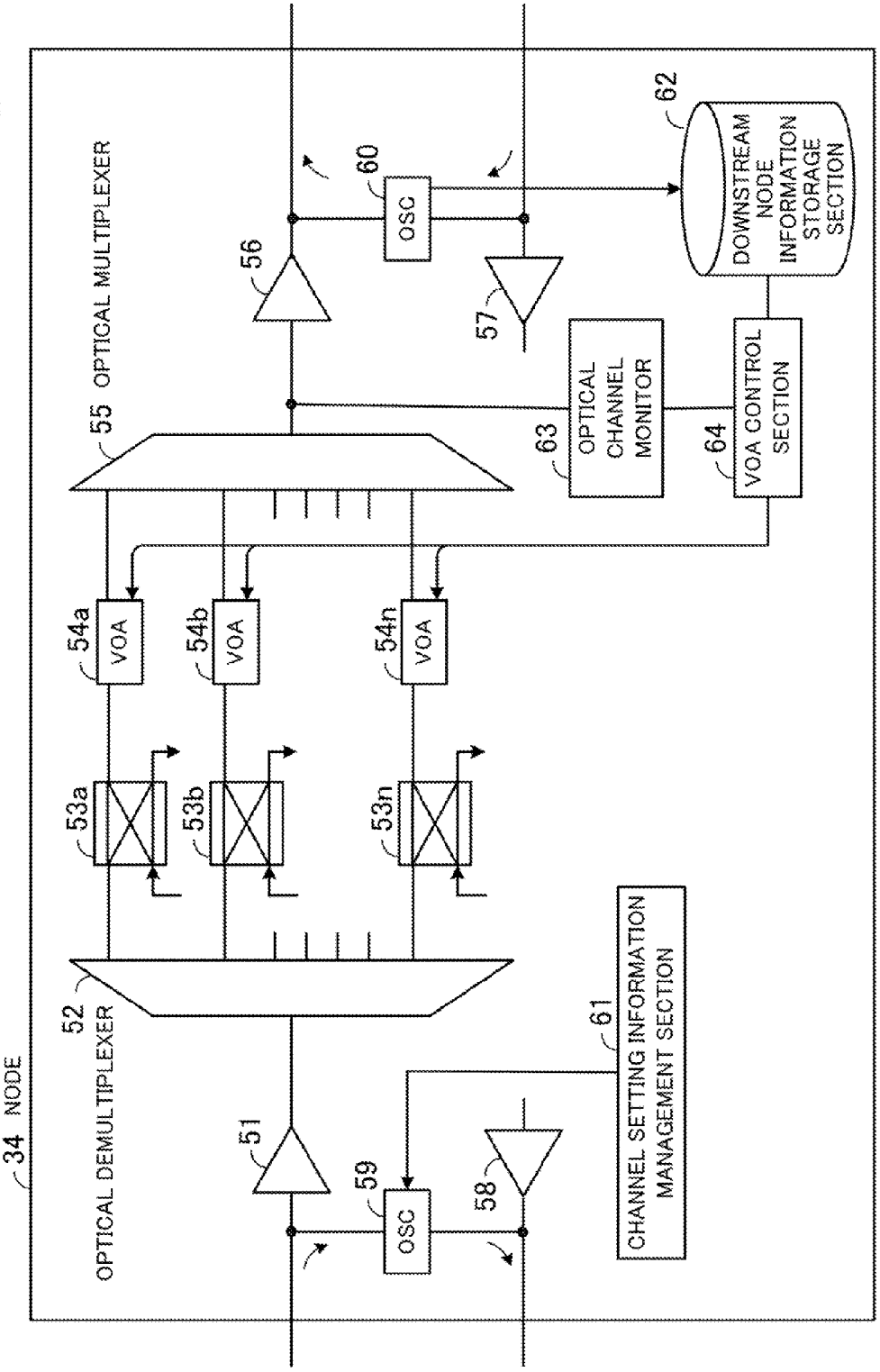
FIG. 7 is a block diagram of a node (part 1)

FIG. 7 is a block diagram of a node (part 1). FIG. 7 is a block diagram of the node 34 of FIG. 6. As illustrated in FIG. 7, the node 34 includes preamplifiers 51 and 57, an optical demultiplexer 52, optical switches 53a, 53b, . . . , and 53n, VOAs 54a, 54b, . . . , and 54n, an optical multiplexer 55, postamplifiers 56 and 58, OSCs (Optical Supervisory Channels) 59 and 60, a channel setting information management section 61, a downstream node information storage section 62, an optical channel monitor 63, and a VOA control section 64.

The preamplifier 51 amplifies a signal light transmitted from the upstream node 33. The preamplifier 51 is, for example, an EDFA (Erbium-Doped Fiber Amplifier). The preamplifier 51 corresponds to, for example, the preamplifier 31a illustrated in FIG. 6.

The optical demultiplexer 52 separates the WDM signal light amplified by the preamplifier 51 into signal light components with different wavelengths (in different channels).

On the basis of setting performed in advance, the optical switches 53a, 53b, . . . , and 53n perform add processes for transmitting signal lights inputted from an external network to the downstream side in place of the signal lights obtained as a result of demultiplexing by the optical demultiplexer 52. In addition, on the basis of setting performed in advance, the optical switches 53a, 53b, ..., and 53n perform drop processes for making the signal lights obtained as a result of demultiplexing by the optical demultiplexer 52 branch to an external network. Furthermore, on the basis of setting performed in advance, the optical switches 53a, 53b, ..., and 53n perform through processes for transmitting the signal lights obtained as a result of demultiplexing by the optical demultiplexer 52 to the downstream side in their original condition.

The VOAs 54a, 54b, ..., and 54n attenuate the power of the signal lights outputted from the optical switches 53a, 53b, ..., and 53n, respectively, under the control of the VOA control section 64.

The optical multiplexer 55 combines the signal lights in the channels outputted from the VOAs 54a, 54b, ..., and 54n. The optical demultiplexer 52, the optical switches 53a, 53b, ..., and 53n, the VOAs 54a, 54b, ..., and 54n, and the optical multiplexer 55 correspond to the OADM 31b illustrated in FIG. 6.

The postamplifier 56 amplifies a signal light outputted from the optical multiplexer 55 and transmits it to the downstream node 35 via the transmission line. The postamplifier 56 is, for example, an EDFA. The postamplifier 56 corresponds to, for example, the postamplifier 31c illustrated in FIG. 6.

The preamplifier 57 amplifies a signal light transmitted from the downstream node 35. The preamplifier 57 is, for example, an EDFA. In FIG. 6, the preamplifier 57 of FIG. 7 is not illustrated.

The postamplifier 58 amplifies a signal light added or dropped by an OADM (not illustrated), and transmits it to the upstream node 33 via the transmission line. The OADM (not illustrated) is equal in structure to the optical demultiplexer 52, the optical switches 53a, 53b, ..., and 53n, the VOAs 54a, 54b, ..., and 54n, and the optical multiplexer 55. The postamplifier 58 is, for example, an EDFA. In FIG. 6, the postamplifier 58 of FIG. 7 is not illustrated.

An OSC light transmitted from the upstream node 33 is made by an optical coupler (not illustrated) to branch from a signal light, and is inputted to the OSC 59. The OSC 59 exercises determined supervisory control on the basis of the OSC light received.

In addition, the OSC 59 outputs the OSC light. The OSC 59 adds channel setting information outputted from the channel setting information management section 61 to the OSC light to be outputted. The OSC light outputted from the OSC 59 and the signal light outputted from the postamplifier 58 are combined by an optical coupler (not illustrated) and are transmitted to the upstream node 33.

An OSC light transmitted from the downstream node 35 is made by an optical coupler (not illustrated) to branch from a signal light, and is inputted to the OSC 60. The OSC 60 exercises determined supervisory control on the basis of the OSC light received.

The OSC light received from the downstream node 35 includes channel setting information for the node 35. The OSC 60 stores the channel setting information included in the received OSC light in the downstream node information storage section 62.

In addition, the OSC 60 outputs the OSC light. The OSC light outputted from the OSC 60 and the signal light outputted from the postamplifier 56 are combined by an optical coupler (not illustrated) and are transmitted to the downstream node 35.

The channel setting information management section 61 outputs channel setting information to the OSC 59. The channel setting information includes an identifier, such as a node name, given to the node 34, information regarding a channel used for transmitting a signal light, transmission channel information indicative of whether a channel is a signal light channel or a no-signal channel, path information indicative of whether a signal light is added to or dropped from a channel or is transmitted in its original condition via the channel, and the like. As a result, the upstream node 33 can recognize a channel to or from which the node 34 on the downstream side of and next to the node 33 adds or drops a signal light. The upstream node 33 is informed of the channel setting information, for example, at the beginning of the operation of the optical network or periodically.

The downstream node information storage section 62 stores the channel setting information for the downstream node 35 transmitted from the node 35.

A part of the signal light outputted from the optical multiplexer 55 is made by an optical coupler (not illustrated) to branch, and is inputted to the optical channel monitor 63. The optical channel monitor 63 monitors the power of a signal light in each channel inputted thereto and outputs monitoring results to the VOA control section 64. The optical channel monitor 63 is, for example, a spectrum analyzer.

On the basis of the results of monitoring by the optical channel monitor 63, the VOA control section 64 controls the VOAs 54a, 54b, ..., and 54n. For example, when the VOA control section 64 determines on the basis of the results of monitoring by the optical channel monitor 63 that a signal light is transmitted by small-number channel transmission, the VOA control section 64 makes attenuation amounts in the VOAs 54a, 54b, ..., and 54n small so that an ASE light will be transmitted along a no-signal channel a wavelength for which is within a determined range from wavelengths for signal light channels used in the small-number channel transmission. For example, a wavelength for a no-signal channel is within the range of ±2.5 nm from wavelengths for signal light channels used in the small-number channel transmission.

Furthermore, when the VOA control section 64 determines on the basis of the results of monitoring by the optical channel monitor 63 that switching from multichannel transmission to small-number channel transmission is performed, the VOA control section 64 refers to the downstream node information storage section 62 and determines whether or not the downstream node 35 drops a signal light from a no-signal transition channel a wavelength for which is within a determined range from wavelengths for signal light channels used in the small-number channel transmission. If the downstream node 35 drops a signal light from a no-signal transition channel a wavelength for which is within the determined range from the wavelengths for the signal light channels used in the small-number channel transmission, then the VOA control section 64 makes an attenuation amount in the no-signal transition channel larger than a determined value. As a result, the downstream node 35 determines that a signal light is not transmitted via the channel from which the downstream node 35 drops a signal light.

Figure 8:
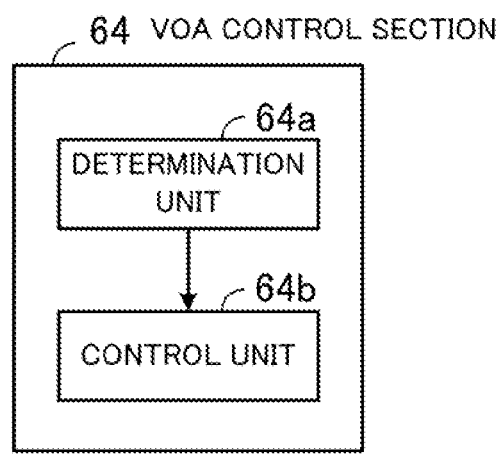
FIG. 8 is a block diagram of a VOA control section.

FIG. 8 is a block diagram of the VOA control section. As illustrated in FIG. 8, the VOA control section 64 includes a determination unit 64a and a control unit 64b.

The determination unit 64a determines, on the basis of the power of a signal light in each channel outputted from the optical channel monitor 63, determines whether or not switching from multichannel transmission to small-number channel transmission is performed. On the basis of whether the power of a signal light is smaller than or equal to a determined threshold, for example, the determination unit 64*a* determines whether or not switching from multichannel transmission to small-number channel transmission is performed. Furthermore, even if the power of a signal light is not smaller than or equal to the determined threshold, the determination unit 64*a* determines, from the shape of a spectrum measured by the optical channel monitor 63, whether an ASE light or a signal light is transmitted, and determines whether or not switching from multichannel transmission to small-number channel transmission is performed.

When the determination unit 64*a* determines that switching from multichannel transmission to small-number channel transmission is performed, the control unit 64*b* refers to the downstream node information storage section 62 and determines whether or not the downstream node 35 is to drop a signal light from a no-signal transition channel a wavelength for which is within a determined range from wavelengths for signal light channels used in the small-number channel transmission. If the downstream node 35 is to drop a signal light from a no-signal transition channel a wavelength for which is within the determined range from the wavelengths for signal light channels used in the small-number channel transmission, then the control unit 64*b* makes an attenuation amount in the no-signal transition channel larger than a determined value.

Figure 9:
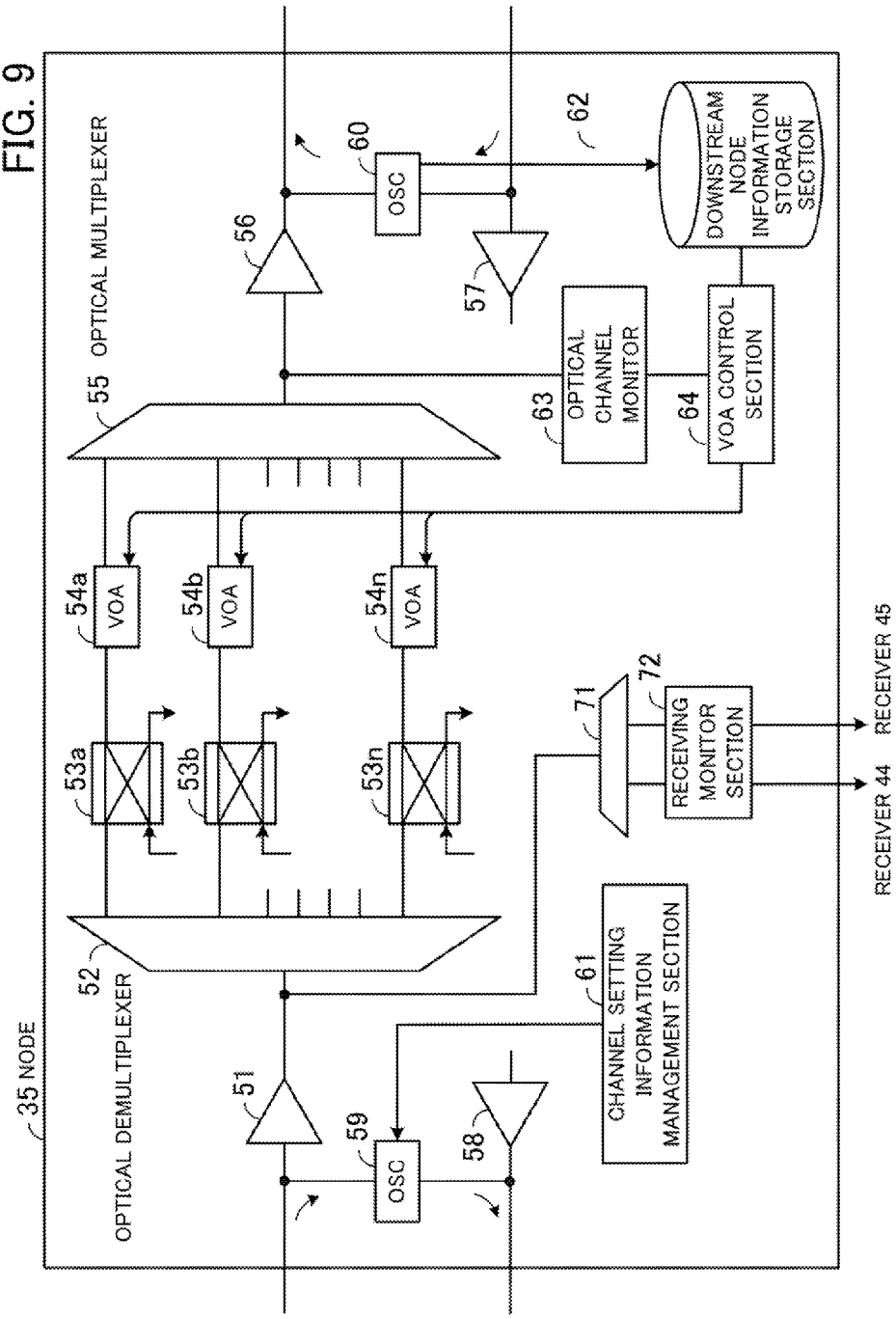
FIG. 9 is a block diagram of a node (part 2)

FIG. 9 is a block diagram of the node (part 2). FIG. 9 is a block diagram of the node 35 of FIG. 6. Components in FIG. 9 which are the same as those illustrated in FIG. 7 are marked with the same symbols and descriptions of them will be omitted.

As illustrated in FIG. 9, the node 35 includes an optical demultiplexer 71 and a receiving monitor section 72. A part of a signal light amplified by a preamplifier 51 is made by a coupler (not illustrated) to branch, and is inputted to the optical demultiplexer 71. The optical demultiplexer 71 separates a signal light component to be dropped from a channel from the signal light inputted, and outputs it to the receiving monitor section 72. In the example of FIG. 6, for example, the optical demultiplexer 71 separates signal light components in the channels a and b from the signal light inputted, and outputs them to the receiving monitor section 72.

The receiving monitor section 72 monitors the power of the signal lights to be dropped from the channels a and b. When the power of a signal light becomes smaller than or equal to a determined threshold, the receiving monitor section 72 determines that a communication failure has occurred. The receiving monitor section 72 then switches a line from a currently used system to a spare system in order to avoid the communication failure.

The signal lights in the channels a and b outputted from the optical demultiplexer 71 are outputted to the receivers 44 and 45 respectively. A channel setting information management section 61 illustrated in FIG. 9 outputs channel setting information stored in a downstream node information storage section 62 described in FIG. 7 to an OSC 59. Furthermore, the downstream node information storage section 62 illustrated in FIG. 9 stores channel setting information transmitted from a node on the downstream side of the node 35.

Channel setting information stored in a downstream node information storage section included in each of the nodes 31 through 34 illustrated in FIG. 6 will now be described.

FIG. 10 illustrates an example of the structure of channel setting information stored in a downstream node information storage section (part 1). FIG. 10 indicates channel setting information stored in a downstream node information storage section included in the node 31.

As illustrated in FIG. 10, the downstream node information storage section includes Downstream Node Name, Channel, Transmission Channel Information, and Path Information columns. A node name of the node 32 on the downstream side of the node 31 is stored in the Downstream Node Name column. If the node name of the node 32 is node B, then node B is stored in the Downstream Node Name column.

A channel used by the node 32 on the downstream side of the node 31 for transmitting a signal light is stored in the Channel column. For example, if channels used by the node 32 for transmitting a signal light are "1, 2, . . . , a, b, c, . . . ", then, as indicated in FIG. 10, 1, 2, . . . , a, b, c, . . . are stored in the Channel column.

Information indicative of whether a channel used by the node 32 on the downstream side of the node 31 for transmitting a signal light is a signal light channel or a no-signal channel is stored in the Transmission Channel Information column. If a channel used by the node 32 for transmitting a signal light is a signal light channel, then "1", for example, is stored in the Transmission Channel Information column. If a channel used by the node 32 for transmitting a signal light is a no-signal channel, then "0", for example, is stored in the Transmission Channel Information column. In the example of FIG. 6, the node 32 uses the channels a, b, and c for transmitting a signal light. Therefore, as indicated in FIG. 10, transmission channel information corresponding to the channels a, b, and c is "1".

Information for a channel from which the node 32 on the downstream side of the node 31 drops a signal light is stored in the Path Information column. If the downstream node 32 drops a signal light from a channel, then "1", for example, is stored in the Path Information column corresponding to the channel. If the downstream node 32 adds a signal light to a channel or if the downstream node 32 transmits a signal light in its original condition via a channel, then "0", for example, is stored in the Path Information column corresponding to the channel. In the example of FIG. 6, the node 32 on the downstream side of the node 31 does not drop a signal light from a channel. Therefore, as indicated in FIG. 10, 0's are stored in the Path Information column.

FIG. 11 illustrates an example of the structure of channel setting information stored in a downstream node information storage section (part 2). FIG. 11 indicates channel setting information stored in a downstream node information storage section included in the node 32.

The downstream node information storage section of the node 32 includes the same columns that the downstream node information storage section described in FIG. 10 includes. Information regarding the node 33 on the downstream side of the node 32 is stored in each column. In the example of FIG. 6, information indicated in FIG. 11 is stored in the downstream node information storage section of the node 32. A node name of the node 33 on the downstream side of the node 32 is node C.

FIG. 12 illustrates an example of the structure of channel setting information stored in a downstream node information storage section (part 3). FIG. 12 indicates channel setting information stored in a downstream node information storage section included in the node 33.

The downstream node information storage section of the node 33 includes the same columns that the downstream node information storage section described in FIG. 10 includes. Information regarding the node 34 on the downstream side of the node 33 is stored in each column. In the example of FIG. 6, information indicated in FIG. 12 is stored in the downstream node information storage section of the node 33. A node name of the node 34 on the downstream side of the node 33 is node D.

FIG. 13 illustrates an example of the structure of channel setting information stored in the downstream node information storage section (part 4). FIG. 13 indicates channel setting information stored in the downstream node information storage section 62 included in the node 34.

The downstream node information storage section 62 of the node 34 includes the same columns that the downstream node information storage section described in FIG. 10 includes. Information regarding the node 35 on the downstream side of the node 34 is stored in each column. In the example of FIG. 6, information indicated in FIG. 13 is stored in the downstream node information storage section 62 of the node 34. A node name of the node 35 on the downstream side of the node 34 is node E. In addition, the node 35 of FIG. 6 drops signal lights from the channels a and b. Therefore, as indicated in FIG. 13, "1" is stored in the Path Information column corresponding to the channels a and b.

If the breaking of the line D21 occurs in FIG. 6, then the VOA control section 64 of the node 34 determines that switching from multichannel transmission to small-number channel transmission is performed. Switching from multichannel transmission to small-number channel transmission is performed, so the VOA control section 64 refers to the downstream node information storage section 62 and determines whether or not the downstream node 35 drops a signal light from the no-signal transition channel "a" the wavelength for which is within the determined range from the wavelength for the signal light channel "b" used in the small-number channel transmission. As can be seen from the path information indicated in FIG. 13, the downstream node 35 drops a signal light from the channel a. Therefore, the VOA control section 64 makes an attenuation amount in the no-signal transition channel "a" larger than a determined value.

As can be seen from the path information indicated in FIG. 11 or 12, on the other hand, the node 33 on the downstream side of the node 32 or the node 34 on the downstream side of the node 33 does not drop a signal light from the channel a. Therefore, in order to make an ASE light path through the channel a, the node 32 or 33 exercises control to make an attenuation amount in a corresponding VOA small.

Figure 14:
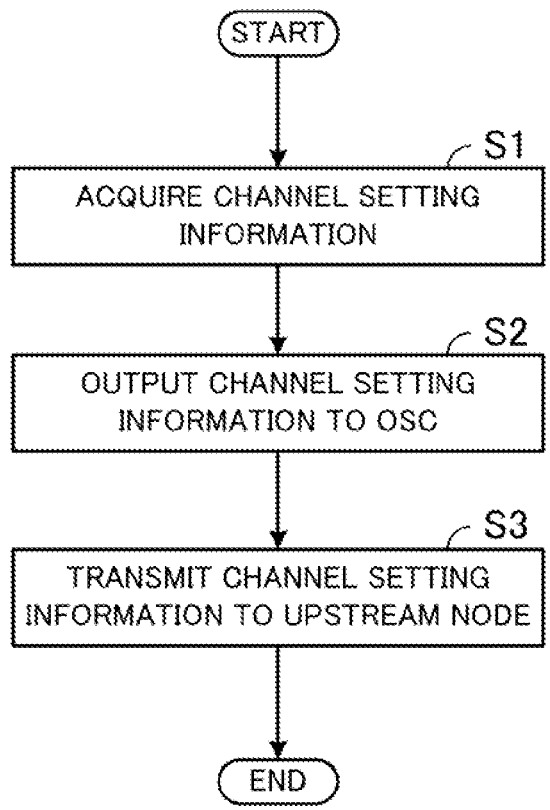
FIG. 14 is a flow chart of channel setting information notification operation.

FIG. 14 is a flow chart of channel setting information notification operation. FIG. 14 indicates channel setting information notification operation by the node 34 illustrated in FIG. 7.

(Step S1) The channel setting information management section 61 manages channel setting information set for the node 34. The channel setting information is set, for example, by an operator before the operation of the node 34. The channel setting information management section 61 acquires the channel setting information at the beginning of the operation of the optical network or periodically.

(Step S2) The channel setting information management section 61 outputs the channel setting information acquired to the OSC 59.

(Step S3) The OSC 59 adds the channel setting information outputted from the channel setting information management section 61 to an OSC light, combines the OSC light with a signal light outputted from the postamplifier 58, and transmits them to the upstream node 33.

The OSC 60 included in the node 34 receives an OSC light from the downstream node 35, acquires channel setting information included in the OSC light received, and stores the channel setting information in the downstream node information storage section 62. Each of the other nodes 31, 32, 33, and 35 gives an upstream node notice of channel setting information in the same way.

Figure 15:
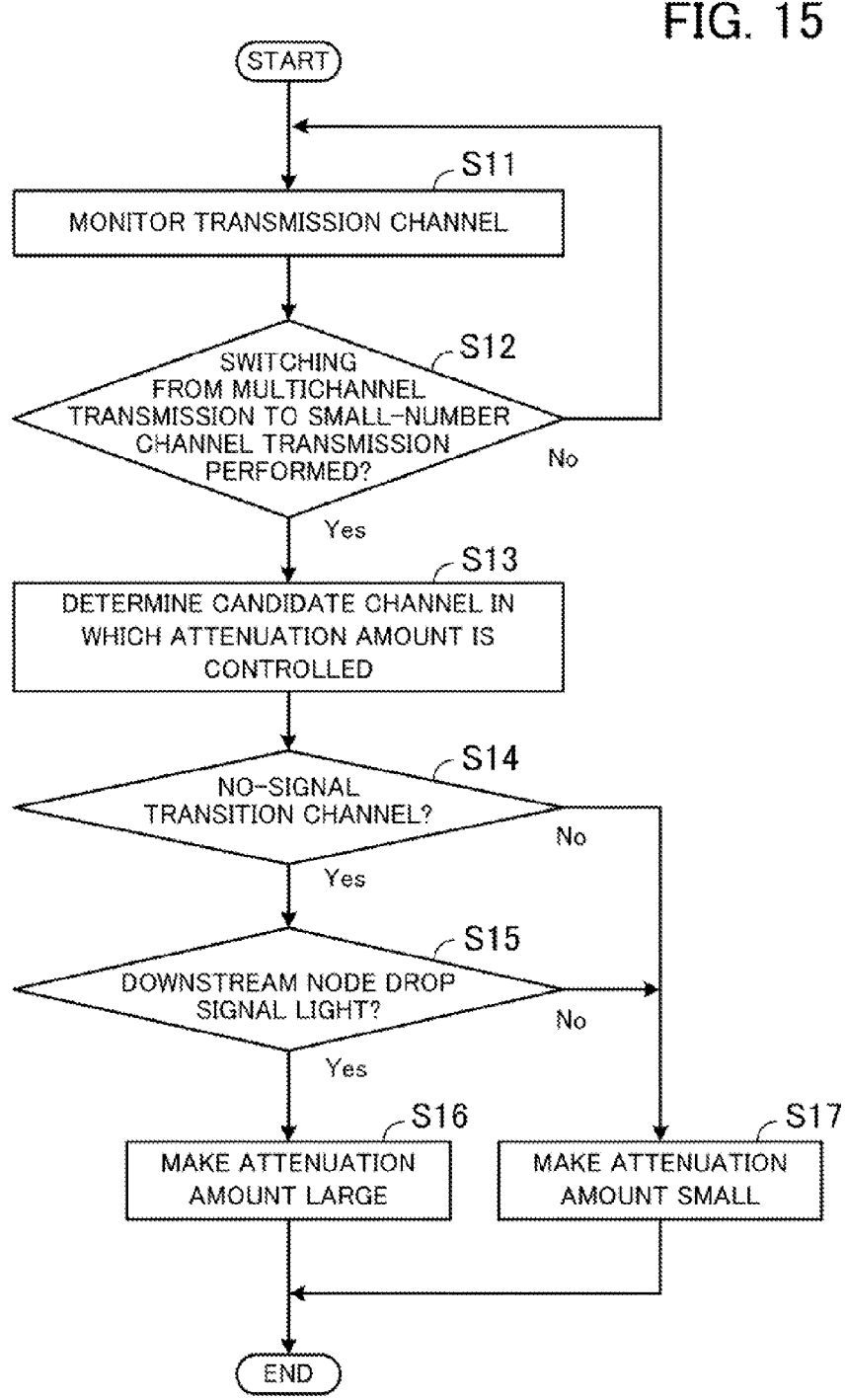
FIG. 15 is a flow chart of the operation of a VOA control section.

FIG. 15 is a flow chart of the operation of a VOA control section. FIG. 15 indicates the operation of the VOA control section 64 illustrated in FIGS. 7 and 8.

(Step S11) The determination unit 64$a$ of the VOA control section 64 monitors the power of a signal light in each channel outputted from the optical channel monitor 63.

(Step S12) On the basis of the power of a signal light in each channel which the determination unit 64$a$ monitors, the determination unit 64$a$ determines whether or not switching from multichannel transmission to small-number channel transmission is performed. If switching from multichannel transmission to small-number channel transmission is not performed, then step S11 is performed. If switching from multichannel transmission to small-number channel transmission is performed, then step S13 is performed.

(Step S13) The control unit 64$b$ determines a candidate channel in which an attenuation amount is controlled. For example, the control unit 64$b$ refers to the downstream node information storage section 62 and determines a no-signal channel a wavelength for which is within a determined range from wavelengths for signal light channels used in the small-number channel transmission as a candidate channel in which an attenuation amount is controlled.

(Step S14) The control unit 64$b$ refers to the downstream node information storage section 62 and determines whether or not the candidate channel determined is a signal light channel at the time when the switching from multichannel transmission to small-number channel transmission is performed. That is to say, the control unit 64$b$ determines whether or not the candidate channel determined in step S13 is a no-signal transition channel, that is to say, the candidate channel determined in step S13 has changed from a signal light channel to a no-signal channel as a result of a communication failure such as the breaking of a line. The reason for this is that a node does not drop a signal light from a no-signal channel via which no signal is originally transmitted (channel which is already a no-signal channel at the time when the switching from multichannel transmission to small-number channel transmission is performed). If the candidate channel is a no-signal transition channel, then step S15 is performed. If the candidate channel is not a no-signal transition channel, then step S17 is performed.

(Step S15) The control unit 64$b$ refers to the downstream node information storage section 62 and determines whether or not the downstream node 35 drops a signal light from the no-signal transition channel. If the downstream node 35 drops a signal light from the no-signal transition channel, then step S16 is performed. If the downstream node 35 does not drop a signal light from the no-signal transition channel, then step S17 is performed.

(Step S16) The control unit 64$b$ makes an attenuation amount in the VOA 54$a$, 54$b$, ..., or 54$n$ corresponding to the channel which is determined in step S15, that is to say, from which the downstream node 35 drops a signal light larger than a determined value. That is to say, the control unit 64$b$ makes an attenuation amount large in order to prevent the downstream node 35 from erroneously recognizing an ASE light as a signal light. Actually, a signal light does not reach the downstream node 35 due to, for example, the breaking of a line.

(Step S17) If the control unit 64$b$ determines in step S14 that the candidate channel is not a no-signal transition channel, then the control unit 64$b$ makes an attenuation amount in the candidate channel small. That is to say, the control unit 64b makes an attenuation amount in the VOA 54a, 54b, ..., or 54n corresponding to the candidate channel small so that an ASE light will be transmitted along the candidate channel.

As has been described, the node 34 determines that switching from multichannel transmission to small-number channel transmission is performed. If the downstream node 35 drops a signal light from a no-signal channel a wavelength for which is within a determined range from wavelengths for signal light channels used in the small-number channel transmission, then the node 34 makes an attenuation amount in the no-signal channel larger than a determined value.

By doing so, the downstream node 35 can detect a communication failure, such as the breaking of a line, which occurs on the upstream side. By detecting a communication failure, the node 35 can switch a line from a currently used system to a spare system.

Furthermore, it is possible to detect a communication failure, such as the breaking of a line, without installing an apparatus for determining whether or not a signal light outputted from the optical demultiplexer 71 is an ASE light.

If an upstream node informs a downstream node of channel setting information and the upstream node drops a signal light from a channel, then the downstream node may make an attenuation amount in the channel large. For example, the channel setting information management section 61, the downstream node information storage section 62, the optical channel monitor 63, and the VOA control section 64 described in FIG. 7 may be located on a route on which the preamplifier, the postamplifier, and the OADM used for transmission from the downstream side to the upstream side are located.

Moreover, in the above description the node 35 drops signal lights received by the receivers 44 and 45 connected thereto. However, the above description applies to the case where an OADM drops a signal light to an external network. For example, the above description applies to the case where the node 35 illustrated in FIG. 6 drops signal lights from the channels a and b to an external network.

A third embodiment will now be described in detail with reference to the drawings. In the third embodiment the case where an optical network includes an OXC (Optical Cross Connect) node will be described. First an example of an optical network including an OXC node will be described.

Figure 16:
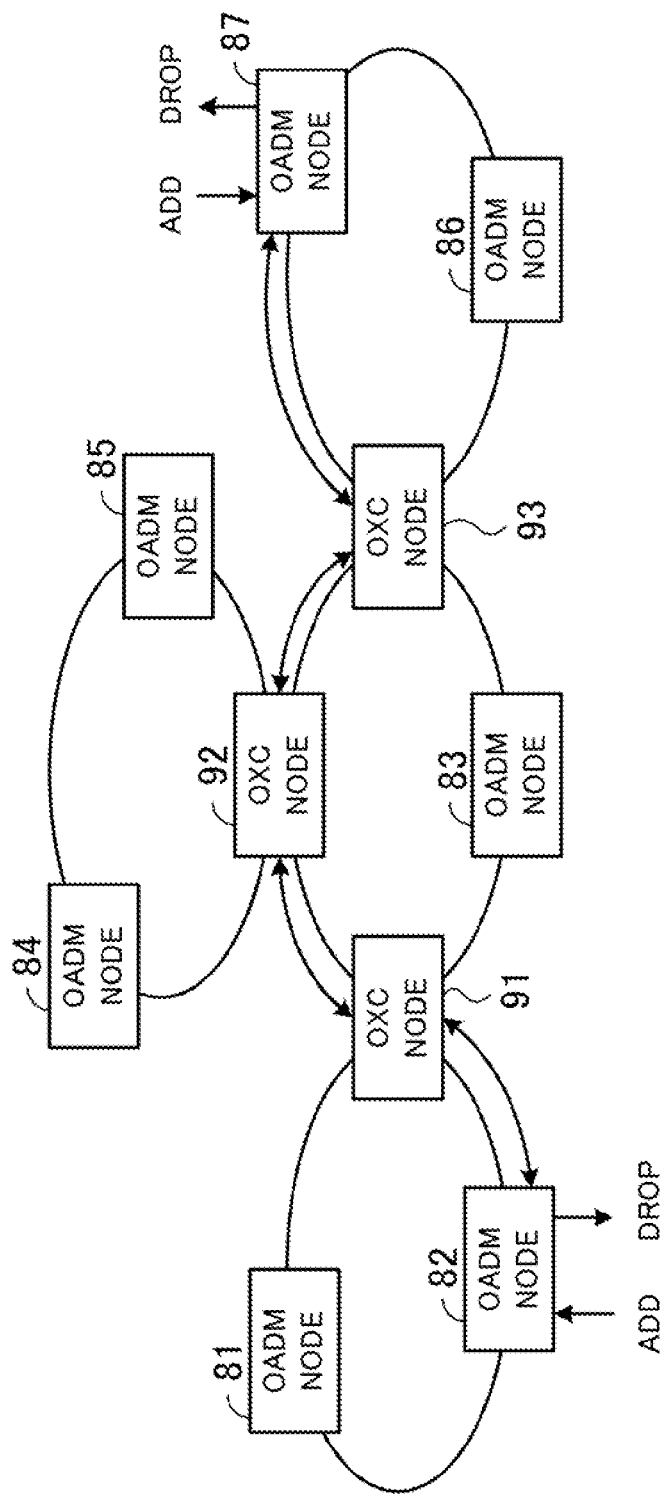
FIG. 16 illustrates an example of an optical network including an OXC node.

FIG. 16 illustrates an example of an optical network including an OXC node. As illustrated in FIG. 16, an optical network includes OADM nodes 81 through 87 and OXC nodes 91 through 93 which are optical transmission apparatus.

Each of the OADM nodes 81 through 87 adds or drops a signal light according to wavelength. This is the same with the nodes 31 through 35 described in FIG. 6. Each of the OXC nodes 91 through 93 switches a signal light path according to wavelength. For example, a signal light added by the OADM node 82 is path-switched by the OXC nodes 91 through 93 and is transmitted to the OADM node 87. The OADM node 87 drops a signal light added by the OADM node 82. Furthermore, example, a signal light added by the OADM node 87 is path-switched by the OXC nodes 91 through 93 and is transmitted to the OADM node 82. The OADM node 82 drops a signal light added by the OADM node 87.

Figure 17:
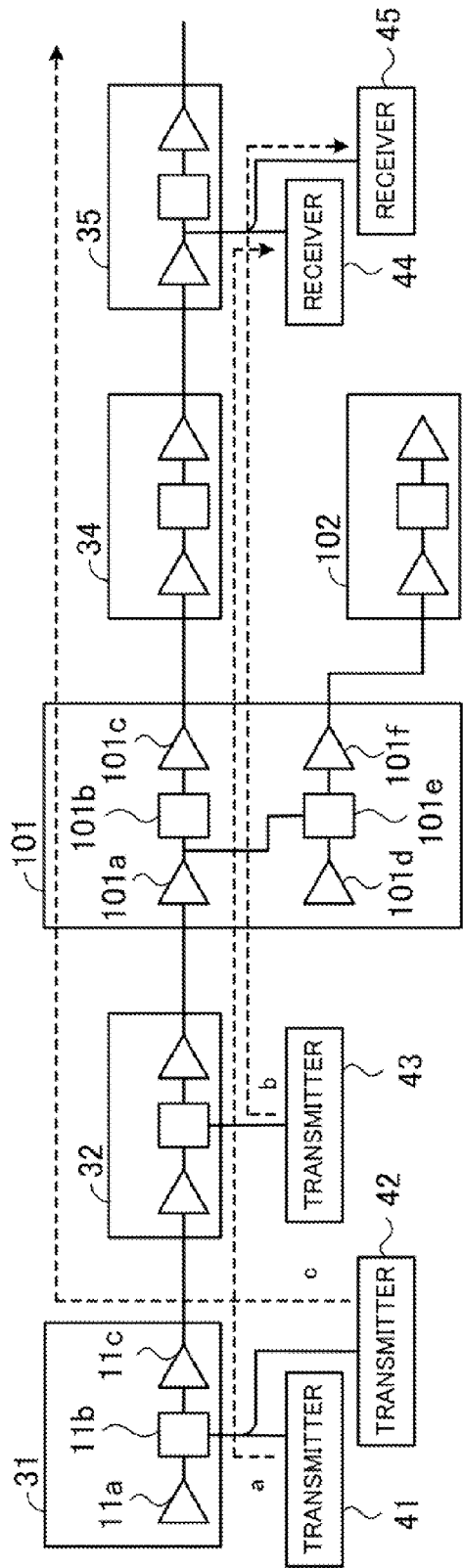
FIG. 17 illustrates an optical network to which an optical transmission apparatus according to a third embodiment is applied.

FIG. 17 illustrates an optical network to which an optical transmission apparatus according to the third embodiment is applied. Components in FIG. 17 which are the same as those illustrated in FIG. 6 are marked with the same symbols and descriptions of them will be omitted.

An optical network illustrated in FIG. 17 includes an OXC node 101. OADM nodes 32, 34, and 102 are connected to the OXC node 101.

The node 101 includes preamplifiers 101a and 101d each of which amplifies a signal light received from the upstream side, WSSes (Wavelength Selectable Switches) 101b and 101e each of which switches a signal light path according to wavelength, and postamplifiers 101c and 101f. The node 101 path-switches a signal light received from, for example, the upstream node 32 to the nodes 34 and 102 according to wavelength.

Figure 18:
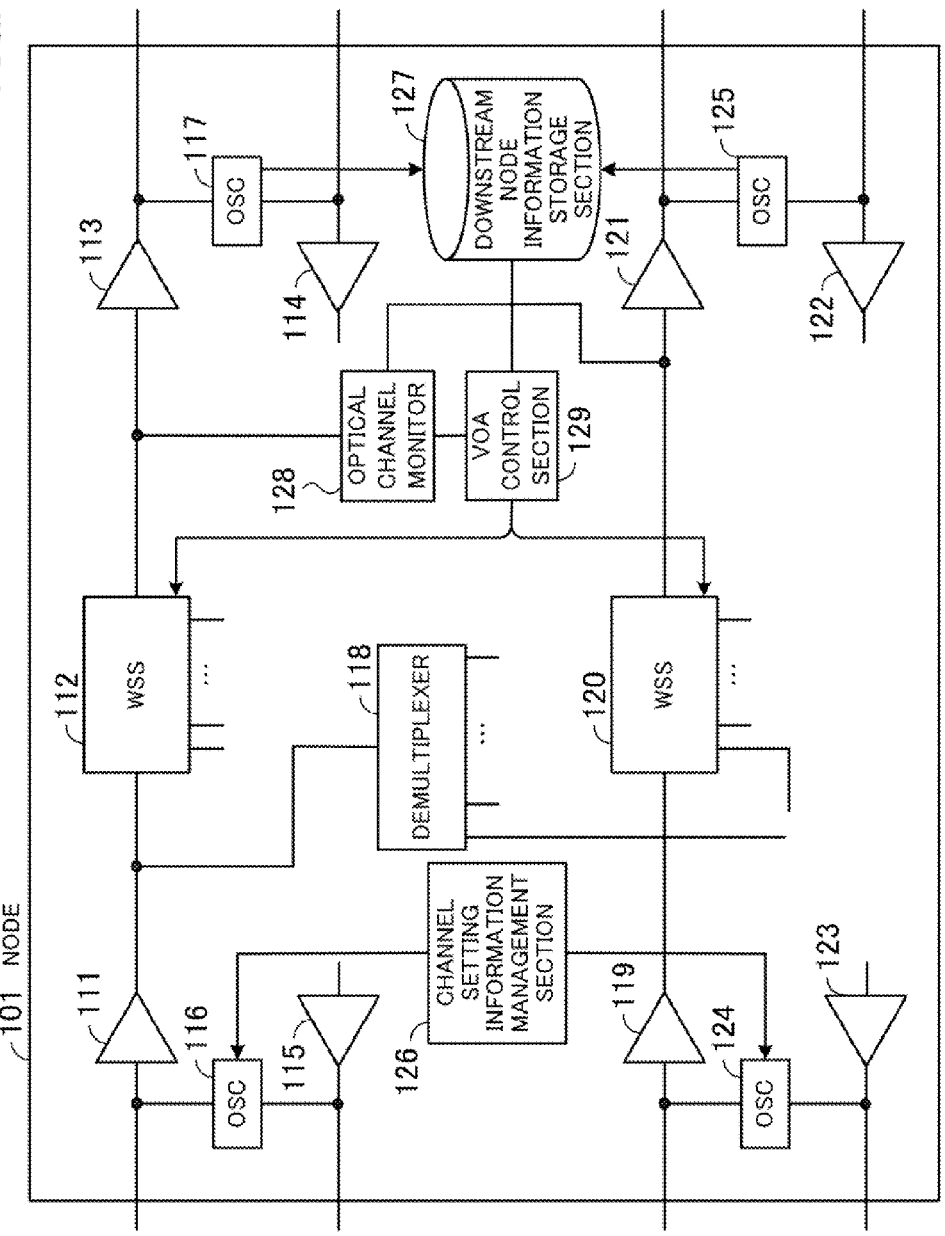
FIG. 18 is a block diagram of an OXC node.

FIG. 18 is a block diagram of the OXC node. As illustrated in FIG. 18, the node 101 includes preamplifiers 111, 114, 119, and 122, WSSes 112 and 120, postamplifiers 113, 115, 121, and 123, OSCs 116, 117, 124, and 125, a demultiplexer 118, a channel setting information management section 126, a downstream node information storage section 127, an optical channel monitor 128, and a VOA control section 129.

The preamplifier 111, the WSS 112, and the postamplifier 113 correspond to the preamplifier 101a, the WSS 101b, and the postamplifier 101c, respectively, illustrated in FIG. 17. The preamplifier 119, the WSS 120, and the postamplifier 121 correspond to the preamplifier 101d, the WSS 101e, and the postamplifier 101f, respectively, illustrated in FIG. 17. In FIG. 17, the preamplifiers 114 and 122 and the postamplifiers 115 and 123 of FIG. 18 are not illustrated.

The node 32 illustrated in FIG. 17 is connected to the preamplifier 111 and the postamplifier 115 via a transmission line. The node 34 illustrated in FIG. 17 is connected to the postamplifier 113 and the preamplifier 114 via a transmission line. The node 102 illustrated in FIG. 17 is connected to the postamplifier 121 and the preamplifier 122 via a transmission line. A node not illustrated in FIG. 17 is connected to the preamplifier 119 and the postamplifier 123 via a transmission line.

The preamplifiers 111, 114, 119, and 122 are the same as the preamplifiers 51 and 57 described in FIG. 7, so descriptions of them will be omitted. The postamplifiers 113, 115, 121, and 123 are the same as the postamplifiers 56 and 58 described in FIG. 7, so descriptions of them will be omitted. The OSCs 116, 117, 124, and 125 are the same as the OSCs 59 and 60 described in FIG. 7, so descriptions of them will be omitted.

The WSS 112 switches a signal light path according to wavelength. For example, the WSS 112 performs switching so as to output a signal light which the downstream node 35 drops from a channel to the node 34. The WSS 112 includes a VOA (not illustrated) which can attenuate the power of a signal light according to wavelength.

A signal light amplified by the preamplifier 111 is inputted to the demultiplexer 118. The demultiplexer 118 separates the signal light inputted into signal light components and outputs them to the WSS 120. For example, the demultiplexer 118 separates a signal light component with a wavelength on which the WSS 120 performs path switching, and outputs it to the WSS 120.

The WSS 120 switches a signal light path according to wavelength. For example, the WSS 120 separates a signal light inputted from the demultiplexer 118 or the preamplifier 119 according to wavelength. For example, the WSS 120 path-switches a signal light to be outputted to the node 102 so as to output it to the postamplifier 121 according to wavelength. The WSS 120 includes a VOA (not illustrated) which can attenuate the power of a signal light according to wavelength.

The channel setting information management section 126 transmits channel setting information regarding the node 101 to the upstream node 32 and the upstream node (not illustrated) connected to the preamplifier 119 via the transmission line. This is the same with the channel setting information management section 61 described in FIG. 7.

The downstream node information storage section 127 stores channel setting information for the downstream node 34 connected to the postamplifier 113 and channel setting information for the downstream node 102 connected to the postamplifier 121.

A part of a signal light outputted from the WSS 112 is made by an optical coupler (not illustrated) to branch, and is inputted to the optical channel monitor 128. In addition, a part of a signal light outputted from the WSS 120 is made by an optical coupler (not illustrated) to branch, and is inputted to the optical channel monitor 128. The optical channel monitor 128 monitors the power of a signal light in each channel outputted from each of the WSSes 112 and 120 and outputs monitoring results to the VOA control section 129.

On the basis of the results of monitoring the signal light outputted from the WSS 112 by the optical channel monitor 128, the VOA control section 129 controls the VOA included in the WSS 112. Furthermore, on the basis of the results of monitoring the signal light outputted from the WSS 120 by the optical channel monitor 128, the VOA control section 129 controls the VOA included in the WSS 120.

For example, when the VOA control section 129 determines, on the basis of the results of monitoring the signal light outputted from the WSS 112 by the optical channel monitor 128, that a signal light is transmitted by small-number channel transmission, the VOA control section 129 makes an attenuation amount in the VOA included in the WSS 112 small so that an ASE light will be transmitted along a no-signal channel a wavelength for which is within a determined range from wavelengths for signal light channels used in the small-number channel transmission. In addition, when the VOA control section 129 determines, on the basis of the results of monitoring the signal light outputted from the WSS 112 by the optical channel monitor 128, that a signal light is transmitted by small-number channel transmission, the VOA control section 129 makes an attenuation amount in the VOA included in the WSS 112 small so that an ASE light will be transmitted along a no-signal channel a wavelength for which is within a determined range from wavelengths for signal light channels used in the small-number channel transmission.

Furthermore, when the VOA control section 129 determines, on the basis of the results of monitoring the signal light outputted from the WSS 112 by the optical channel monitor 128, that switching from multichannel transmission to small-number channel transmission is performed, the VOA control section 129 refers to the downstream node information storage section 127 and determines whether or not the downstream node 34 drops a signal light from a no-signal transition channel a wavelength for which is within a determined range from wavelengths for signal light channels used in the small-number channel transmission. If the downstream node 34 drops a signal light from a no-signal transition channel a wavelength for which is within the determined range from the wavelengths for the signal light channels used in the small-number channel transmission, then the VOA control section 129 makes an attenuation amount in the no-signal transition channel larger than a determined value. In addition, when the VOA control section 129 determines, on the basis of the results of monitoring the signal light outputted from the WSS 120 by the optical channel monitor 128, that switching from multichannel transmission to small-number channel transmission is performed, the VOA control section 129 refers to the downstream node information storage section 127 and determines whether or not the downstream node 102 drops a signal light from a no-signal transition channel a wavelength for which is within a determined range from wavelengths for signal light channels used in the small-number channel transmission. If the downstream node 102 drops a signal light from a no-signal transition channel a wavelength for which is within the determined range from the wavelengths for the signal light channels used in the small-number channel transmission, then the VOA control section 129 makes an attenuation amount in the no-signal transition channel larger than a determined value.

Channel setting information stored in a downstream node information storage section included in each of the nodes 31, 32, 101, and 34 illustrated in FIG. 17 will now be described.

FIG. 19 illustrates an example of the structure of channel setting information stored in a downstream node information storage section (part 1). FIG. 19 indicates channel setting information stored in a downstream node information storage section included in the node 31 illustrated in FIG. 17.

The downstream node information storage section of the node 31 includes the same columns that the downstream node information storage section described in FIG. 10 includes. Information regarding the node 32 on the downstream side of the node 31 is stored in each column. In the example of FIG. 17, information indicated in FIG. 19 is stored in the downstream node information storage section of the node 31. A node name of the node 32 on the downstream side of the node 31 is node B.

FIG. 20 illustrates an example of the structure of channel setting information stored in a downstream node information storage section (part 2). FIG. 20 indicates channel setting information stored in a downstream node information storage section included in the node 32 illustrated in FIG. 17.

The downstream node information storage section of the node 32 includes the same columns that the downstream node information storage section described in FIG. 10 includes. Information regarding the node 101 on the downstream side of the node 32 is stored in each column. In the example of FIG. 17, information indicated in FIG. 20 is stored in the downstream node information storage section of the node 32. A node name of the node 101 on the downstream side of the node 32 is node C.

The OXC node 101 illustrated in FIG. 18 does not drop a signal light. Accordingly, as indicated in FIG. 20, path information is "0". If the node 101 drops a signal light, then "1" is stored in the Path Information column corresponding to a channel from which the node 101 drops a signal light. If the node 101 drops a signal light from, for example, a channel 2, then "1" is stored in the Path Information column corresponding to the channel 2.

If the node 101 drops a signal light, then an optical demultiplexer is connected via a coupler to the output side of each of the preamplifiers 111 and 119 illustrated in FIG. 18. That is to say, the node 101 includes an optical demultiplexer and a receiving monitor section which are the same as the optical demultiplexer 71 and the receiving monitor section 72, respectively, illustrated in FIG. 9. In addition, a receiver which receives a signal light component separated is connected to the optical demultiplexer.

FIG. 21 illustrates an example of the structure of channel setting information stored in the downstream node information storage section (part 3). FIG. 21 indicates channel setting information stored in the downstream node information storage section 127 included in the node 101 illustrated in FIG. 17.

The downstream node information storage section 127 of the node 101 includes the same columns that the downstream node information storage section described in FIG. 10 includes. Information regarding the nodes 34 and 102 on the downstream side of the node 101 is stored in each column. In the example of FIG. 17, information indicated in FIG. 21 is stored in the downstream node information storage section 127 of the node 101. Node names of the nodes 34 and 102 on the downstream side of the node 101 are node D and node Z respectively.

FIG. 22 illustrates an example of the structure of channel setting information stored in a downstream node information storage section (part 4). FIG. 22 indicates channel setting information stored in a downstream node information storage section included in the node 34 illustrated in FIG. 17.

The downstream node information storage section of the node 34 includes the same columns that the downstream node information storage section described in FIG. 10 includes. Information regarding the node 35 on the downstream side of the node 34 is stored in each column. In the example of FIG. 17, information indicated in FIG. 22 is stored in the downstream node information storage section of the node 34. A node name of the node 35 on the downstream side of the node 34 is node E.

Channel setting information notification operation by the node 101 and the operation of the VOA control section 129 are the same as those indicated by the flow charts of FIGS. 14 and 15 respectively. However, the optical channel monitor 128 monitors the level of a signal light outputted from each of the WSSes 112 and 120, and the VOA control section 129 controls the VOAs included in the WSSes 112 and 120.

As has been described, even if a node is an OXC node, an attenuation amount in a channel from which a downstream node drops a signal light is controlled. By doing so, the downstream node can detect a communication failure, such as the breaking of a line, which occurs on the upstream side. In addition, by detecting the communication failure, the node on the downstream side of the OXC node can switch a line from a currently used system to a spare system.

The OXC node 101 may include three or more WSSes. In this case, the optical channel monitor 128 monitors the level of a signal light outputted from each WSS, and the VOA control section 129 controls a VOA included in each WSS on the basis of the result of monitoring the level of a signal light outputted from each WSS. This is the same with the above case where the OXC node 101 includes the two WSSes.

A fourth embodiment will now be described in detail with reference to the drawings. In the fourth embodiment the case where an ILA (InLine Amplifier) node is inserted in an optical network will be described.

Figure 23:
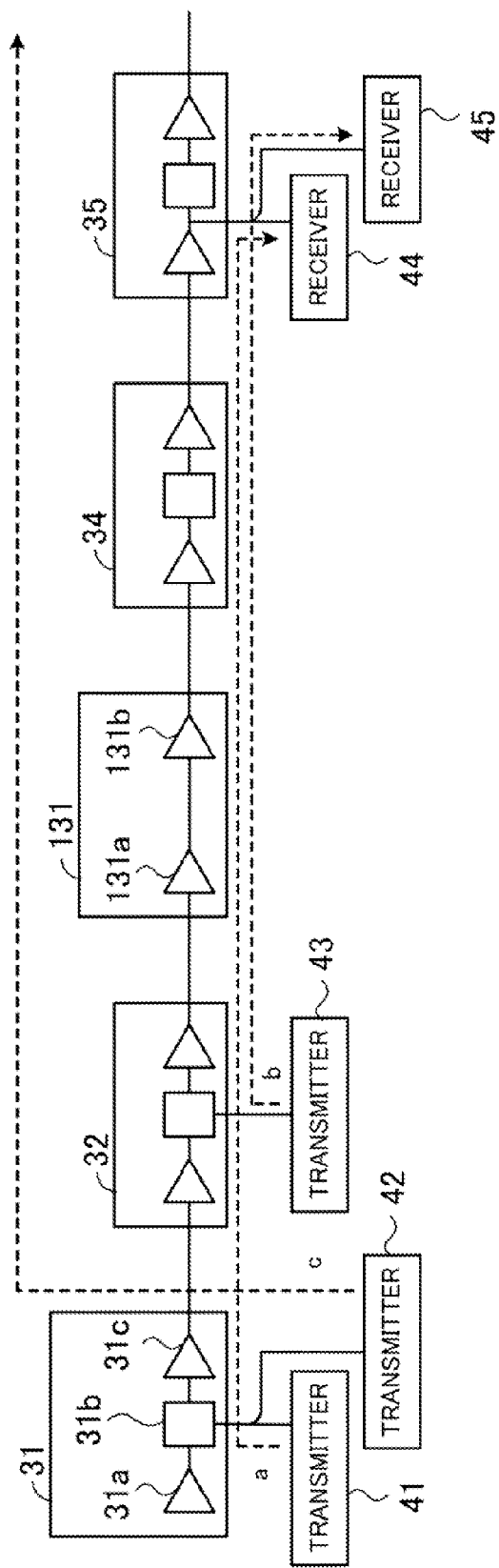
FIG. 23 illustrates an optical network to which an optical transmission apparatus according to a fourth embodiment is applied.

FIG. 23 illustrates an optical network to which an optical transmission apparatus according to a fourth embodiment is applied. Components in FIG. 23 which are the same as those illustrated in FIG. 6 are marked with the same symbols and detailed descriptions of them will be omitted.

In FIG. 23, an ILA node 131 is inserted between nodes 32 and 34. The node 131 includes a preamplifier 131*a* and a postamplifier 131*b*, amplifies a signal light received from the upstream node 32, and outputs it to the downstream node 34.

Figure 24:
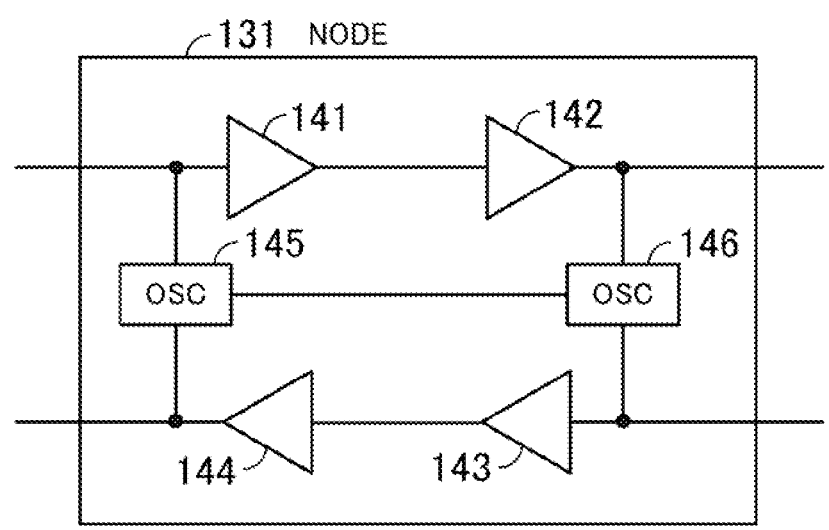
FIG. 24 is a block diagram of an ILA node.

FIG. 24 is a block diagram of the ILA node. As illustrated in FIG. 24, the node 131 includes preamplifiers 141 and 143, postamplifiers 142 and 144, and OSCs 145 and 146.

The preamplifier 141 receives a signal light from the node 32, amplifies it, and outputs it to the postamplifier 142. The postamplifier 142 amplifies the signal light outputted from the preamplifier 141, and outputs it to the node 34.

The preamplifier 143 receives a signal light from the node 34, amplifies it, and outputs it to the postamplifier 144. The postamplifier 144 amplifies the signal light outputted from the preamplifier 143, and outputs it to the node 32.

An OSC light transmitted from the node 32 is inputted to the OSC 145. The OSC light is made by a coupler (not illustrated) at a stage before the preamplifier 141 to branch from a signal light, and is inputted to the OSC 145. In addition, the OSC 145 receives channel setting information outputted from the OSC 146. The OSC 145 outputs an OSC light including the received channel setting information. The OSC light outputted from the OSC 145 is combined with a signal light outputted from the postamplifier 144 by a coupler (not illustrated), and is transmitted to the node 32.

An OSC light transmitted from the node 34 is inputted to the OSC 146. The OSC light is made by a coupler (not illustrated) at a stage before the preamplifier 143 to branch from a signal light, and is inputted to the OSC 146. In addition, the OSC 146 receives channel setting information outputted from the OSC 145. The OSC 146 outputs an OSC light including the received channel setting information. The OSC light outputted from the OSC 146 is combined with a signal light outputted from the postamplifier 142 by a coupler (not illustrated), and is transmitted to the node 34.

Channel setting information stored in a downstream node information storage section included in each of the nodes 31, 32, and 34 illustrated in FIG. 23 will now be described.

FIG. 25 illustrates an example of the structure of channel setting information stored in a downstream node information storage section (part 1). FIG. 25 indicates channel setting information stored in a downstream node information storage section included in the node 31 illustrated in FIG. 23.

The downstream node information storage section of the node 31 includes the same columns that the downstream node information storage section described in FIG. 10 includes. Information regarding the node 32 on the downstream side of the node 31 is stored in each column. In the example of FIG. 23, information indicated in FIG. 25 is stored in the downstream node information storage section of the node 31. A node name of the node 32 on the downstream side of the node 31 is node B.

FIG. 26 illustrates an example of the structure of channel setting information stored in a downstream node information storage section (part 2). FIG. 26 indicates channel setting information stored in a downstream node information storage section included in the node 32 illustrated in FIG. 23.

The downstream node information storage section of the node 32 includes the same columns that the downstream node information storage section described in FIG. 10 includes. Information regarding the node 34 on the downstream side of the node 32 is stored in each column. In the example of FIG. 23, information indicated in FIG. 26 is stored in the downstream node information storage section of the node 32. A node name of the node 34 on the downstream side of the node 32 is node D.

FIG. 27 illustrates an example of the structure of channel setting information stored in a downstream node information storage section (part 3). FIG. 27 indicates channel setting information stored in a downstream node information storage section included in the node 34 illustrated in FIG. 23.

The downstream node information storage section of the node 34 includes the same columns that the downstream node information storage section described in FIG. 10 includes. Information regarding the node 35 on the downstream side of the node 34 is stored in each column. In the example of FIG. 23, information indicated in FIG. 27 is stored in the downstream node information storage section of the node 34. A node name of the node 35 on the downstream side of the node 34 is node E.

As has been described, an ILA node gives an upstream node notice of channel setting information for a downstream node. By doing so, the node on the upstream side of the ILA node controls an attenuation amount in a channel from which the node on the downstream side of the ILA node drops a signal light, and the node on the downstream side of the ILA node can detect a communication failure, such as the breaking of a line, which occurs on the upstream side of the ILA node. In addition, by detecting the communication failure, the node on the downstream side of the ILA node can switch a line from a currently used system to a spare system.

A fifth embodiment will now be described in detail with reference to the drawings. In the second through fourth embodiments each node uses an OSC for giving an upstream node notice of channel setting information. In the fifth embodiment a network management apparatus is used for giving an upstream node notice of channel setting information for a downstream node.

Figure 28:
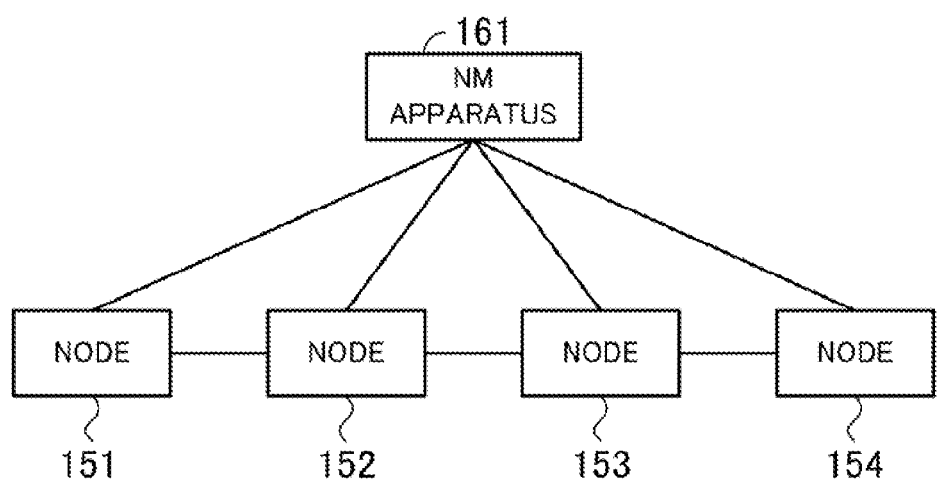
FIG. 28 illustrates an optical network to which an optical transmission apparatus according to a fifth embodiment is applied.

FIG. 28 illustrates an optical network to which an optical transmission apparatus according to the fifth embodiment is applied. As illustrated in FIG. 28, an optical network includes nodes 151 through 154. The optical network of FIG. 28 is, for example, an OUPSR network or a mesh network (not illustrated).

The nodes 151 through 154 are connected to a NM (network management) apparatus 161. The NM apparatus 161 recognizes connection relations among the nodes 151 through 154 which make up the optical network. For example, the NM apparatus 161 recognizes that the node 153 is connected to the upstream side of the node 154.

Each of the nodes 151 through 154 is the OADM node illustrated in FIG. 7 or 9, the OXC node illustrated in FIG. 18, the ILA node illustrated in FIG. 24, or the like. A channel setting information management section included in each of the nodes 151 through 154 transmits channel setting information for each node to the NM apparatus 161.

As stated above, the NM apparatus 161 recognizes the connection relations among the nodes 151 through 154. The NM apparatus 161 transmits channel setting information received from each of the nodes 151 through 154 to its upstream node 151, 152, 153, or 154. For example, when the NM apparatus 161 receives channel setting information from the node 154, the NM apparatus 161 transmits the channel setting information to the node 153.

If an upstream node is an ILA node, then the NM apparatus 161 transmits received channel setting information to a node on the upstream side of the ILA node.

Figure 29:
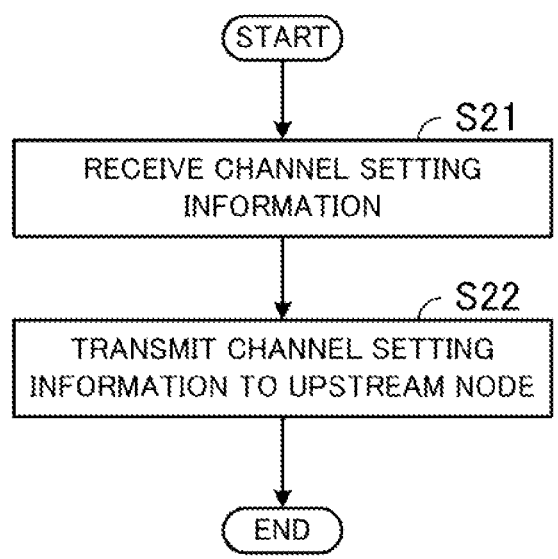
FIG. 29 is a flow chart of the operation of a NM apparatus.

FIG. 29 is a flow chart of the operation of the NM apparatus.

(Step S21) The NM apparatus 161 receives channel setting information from each of the nodes 151 through 154.

(Step S22) On the basis of the connection relations among the nodes 151 through 154 stored in, for example, a storage unit, the NM apparatus 161 transmits the channel setting information received from each of the nodes 151 through 154 to its upstream node 151, 152, 153, or 154.

Each of the nodes 151 through 154 which receives the channel setting information stores the channel setting information in a downstream node information storage section.

As has been described, notice of channel setting information can be given to an upstream node via the NM apparatus 161.

A sixth embodiment will now be described in detail with reference to the drawings. In the fifth embodiment the network management apparatus directly connected to the nodes is used for giving an upstream node notice of channel setting information for a downstream node. In the sixth embodiment nodes are connected to a NM apparatus via a GMPLS (Generalized Multi-Protocol Label Switching) network. The nodes exchange channel setting information with the NM apparatus via the GMPLS network.

Figure 30:
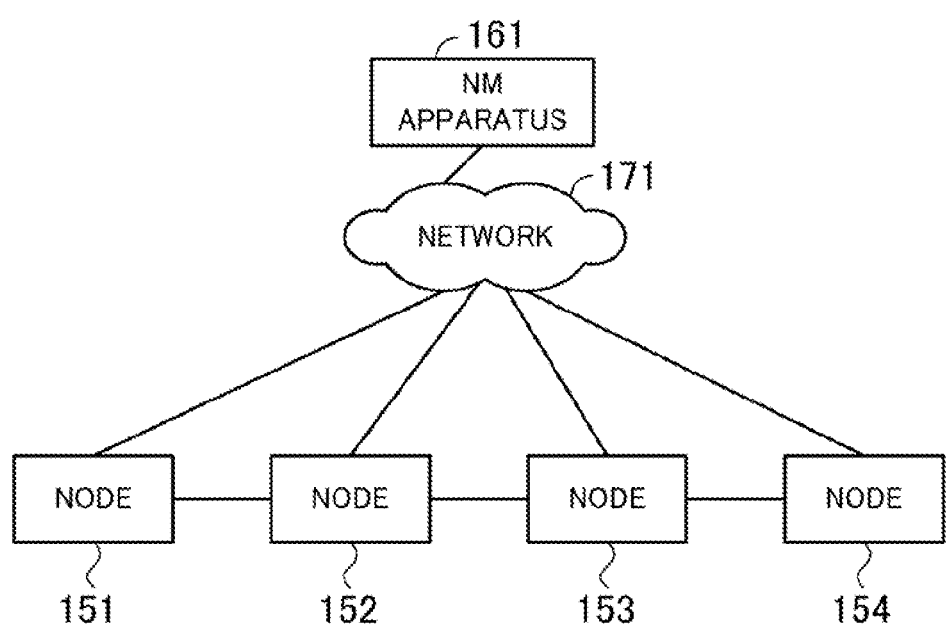
FIG. 30 illustrates an optical network to which an optical transmission apparatus according to a sixth embodiment is applied.

FIG. 30 illustrates an optical network to which an optical transmission apparatus according to the sixth embodiment is applied. Components in FIG. 30 which are the same as those illustrated in FIG. 28 are marked with the same symbols and descriptions of them will be omitted.

As illustrated in FIG. 30, nodes 151 through 154 are connected to a NM apparatus 161 via a network 171. The network 171 is a GMPLS network and the nodes 151 through 154 exchange channel setting information with the NM apparatus 161 via the GMPLS network.

The nodes 151 through 154 exchange channel setting information with the NM apparatus 161 in the same way that is described in the fifth embodiment. That is to say, a channel setting information management section included in each of the nodes 151 through 154 transmits channel setting information to the NM apparatus 161 via the network 171. On the basis of connection relations among the nodes 151 through 154, the NM apparatus 161 transmits the received channel setting information to the upstream node 151, 152, 153, or 154.

Figure 31:
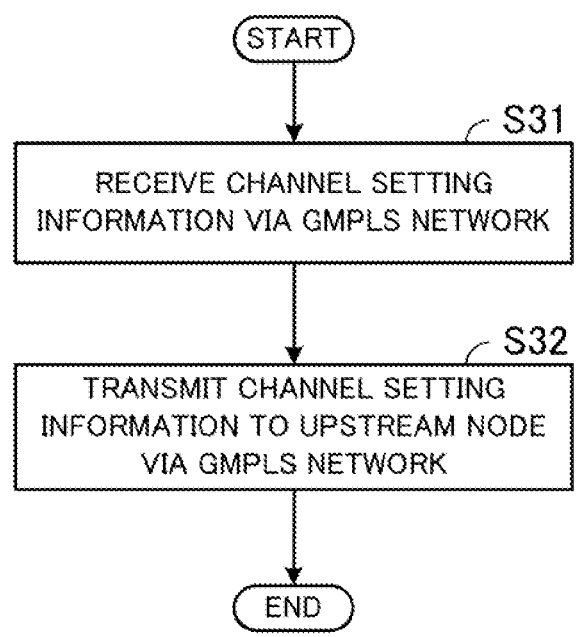
FIG. 31 is a flow chart of the operation of a NM apparatus.

FIG. 31 is a flow chart of the operation of the NM apparatus.

(Step S31) The NM apparatus 161 receives channel setting information from each of the nodes 151 through 154 via the GMPLS network.

(Step S32) On the basis of the connection relations among the nodes 151 through 154 stored in, for example, a storage unit, the NM apparatus 161 transmits the channel setting information received from each of the nodes 151 through 154 to its upstream node 151, 152, 153, or 154 via the GMPLS network.

Each of the nodes 151 through 154 which receives the channel setting information stores the channel setting information in a downstream node information storage section.

As has been described, the NM apparatus 161 can give an upstream node notice of channel setting information via the GMPLS network.

According to the apparatus and method disclosed, a communication failure can be detected even if switching from multichannel transmission to small-number channel transmission is performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An optical transmission apparatus comprising:
 a storage device which stores information regarding a channel from which an optical transmission apparatus at a subsequent stage drops a signal light; and
 a processor that is operative to determine that switching from second channel transmission, using a larger number of channels than a first number of channels, to a first channel transmission has been performed, and to control an attenuation amount, at the time of performing the first channel transmission using the first number of channels, so as to transmit an amplified spontaneous emission light along a no-signal channel a wavelength which is within a determined range from a wavelength of a signal light channel, and to refer to the storage device according to the determination and make, in the case of the no-signal channel, the wavelength which is within the determined range from the wavelength of the signal light channel, and used in the first channel transmission being the channel from which the optical transmission apparatus at the subsequent stage drops a signal light, an attenuation amount in the no-signal channel larger than a determined value.

2. The optical transmission apparatus according to claim 1, wherein the processor is operative to determine whether or not the no-signal channel of the wavelength which is within the determined range from the wavelength of the signal light channel used in the first channel transmission is a signal light channel at the time when the switching from the second channel transmission to the first channel transmission is performed.

3. The optical transmission apparatus according to claim 1, further comprising a transmitter which transmits information regarding a channel from which the optical transmission apparatus drops a signal light to an optical transmission apparatus at a previous stage.

4. The optical transmission apparatus according to claim 3, wherein the transmitter uses an OSC light for transmitting the information regarding the channel from which the optical transmission apparatus drops a signal light to the optical transmission apparatus at the previous stage.

5. The optical transmission apparatus according to claim 1, further comprising a transmitter which transmits information regarding a channel from which the optical transmission apparatus drops a signal light to a network management apparatus, wherein the information regarding the channel from which the optical transmission apparatus drops a signal light is transmitted to an optical transmission apparatus at a previous stage by the network management apparatus.

6. The optical transmission apparatus according to claim 5, wherein the information regarding the channel from which the optical transmission apparatus drops a signal light is transmitted to the network management apparatus by the use of a GMPLS network.

7. The optical transmission apparatus according to claim 1, further comprising a plurality of wavelength selectable switches each including a variable optical attenuator for controlling power in each channel,
wherein:
the processor is operative to monitor a signal light outputted from each of the plurality of wavelength selectable switches, and determine that switching from the second channel transmission to the first channel transmission is performed, and
to refer to the storage device according to the determination, and control an attenuation amount in the variable optical attenuator included in each of the plurality of wavelength selectable switches.

8. The optical transmission apparatus according to claim 1, wherein:
the optical transmission apparatus at the subsequent stage is an ILA optical transmission apparatus; and
the storage device stores information regarding a channel from which an optical transmission apparatus at a subsequent stage of the inline amplifier optical transmission apparatus drops a signal light.

9. An optical attenuation amount control method by an optical transmission apparatus for controlling an attenuation amount, at the time of performing first channel transmission using a first number of channels, so as to transmit an amplified spontaneous emission light along a no-signal channel, of a wavelength which is within a determined range from a wavelength of a signal light channel, the method comprising:
determining by a processor that switching from a second channel transmission using a larger number of channels than the first number of channels to the first channel transmission has been performed; and referring, according to the determining, to a storage device which stores information regarding a channel from which an optical transmission apparatus at a subsequent stage drops a signal light, and making, in the case of the no-signal channel the wavelength which is within the determined range from the wavelength of the signal light channel used in the first channel transmission being the channel which the optical transmission apparatus at the subsequent stage drops a signal light, an attenuation amount in the no-signal channel larger than a determined value.

* * * * *